United States Patent
Ravichandran

(10) Patent No.: US 11,134,363 B2
(45) Date of Patent: Sep. 28, 2021

(54) SYSTEMS AND METHODS FOR PROVIDING SIM-BASED APPLICATIONS AND SERVICES

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 201 days.

(21) Appl. No.: 16/433,149

(22) Filed: Jun. 6, 2019

(65) Prior Publication Data

US 2020/0389775 A1    Dec. 10, 2020

(51) Int. Cl.
*H04W 4/60* (2018.01)
*H04W 4/12* (2009.01)
*H04W 60/00* (2009.01)

(52) U.S. Cl.
CPC ............ *H04W 4/60* (2018.02); *H04W 4/12* (2013.01); *H04W 60/00* (2013.01)

(58) Field of Classification Search
CPC ......... H04W 4/60; H04W 4/12; H04W 60/00; H04W 12/06; H04W 4/14; H04W 8/245; H04W 8/183
See application file for complete search history.

(56) References Cited

U.S. PATENT DOCUMENTS

| | | | | |
|---|---|---|---|---|
| 2008/0013525 A1* | 1/2008 | Sakaguchi | ........ | H04L 29/06027 370/352 |
| 2009/0225736 A1* | 9/2009 | Patarkazishvili | ....... | H04W 8/20 370/338 |
| 2014/0273927 A1* | 9/2014 | Trapp | .................... | H04L 61/605 455/406 |
| 2018/0288228 A1* | 10/2018 | Frazier | ................ | H04L 65/1069 |
| 2019/0090309 A1* | 3/2019 | Wong | .................... | H04W 36/14 |
| 2020/0351406 A1* | 11/2020 | Patel | ................... | H04M 7/0024 |

* cited by examiner

*Primary Examiner* — Brandon J Miller
(74) *Attorney, Agent, or Firm* — Lee & Hayes, P.C.

(57) ABSTRACT

Systems and methods for providing additional functions on a user equipment (UE) with an over-the-top (OTT) application are disclosed. The systems and methods can enable the UE to register with a telephony application server (TAS) using a subscriber identity module identification (SIM ID). The registration can enable communications directed to a cellular number, for example, to be redirected to the UE via a Wi-Fi connection through a wireless residential gateway (WRG). The OTT application can enable the UE to utilize the SIM ID to send and receive communications via a cellular network, an internet protocol (IP) network, or both. The OTT application can also provide applications and capabilities that are not otherwise available on the UE. An OTT settings graphical user interface (GUI) can enable the user to dynamically configure how communications are sent and received in response to changing conditions or preferences.

20 Claims, 11 Drawing Sheets

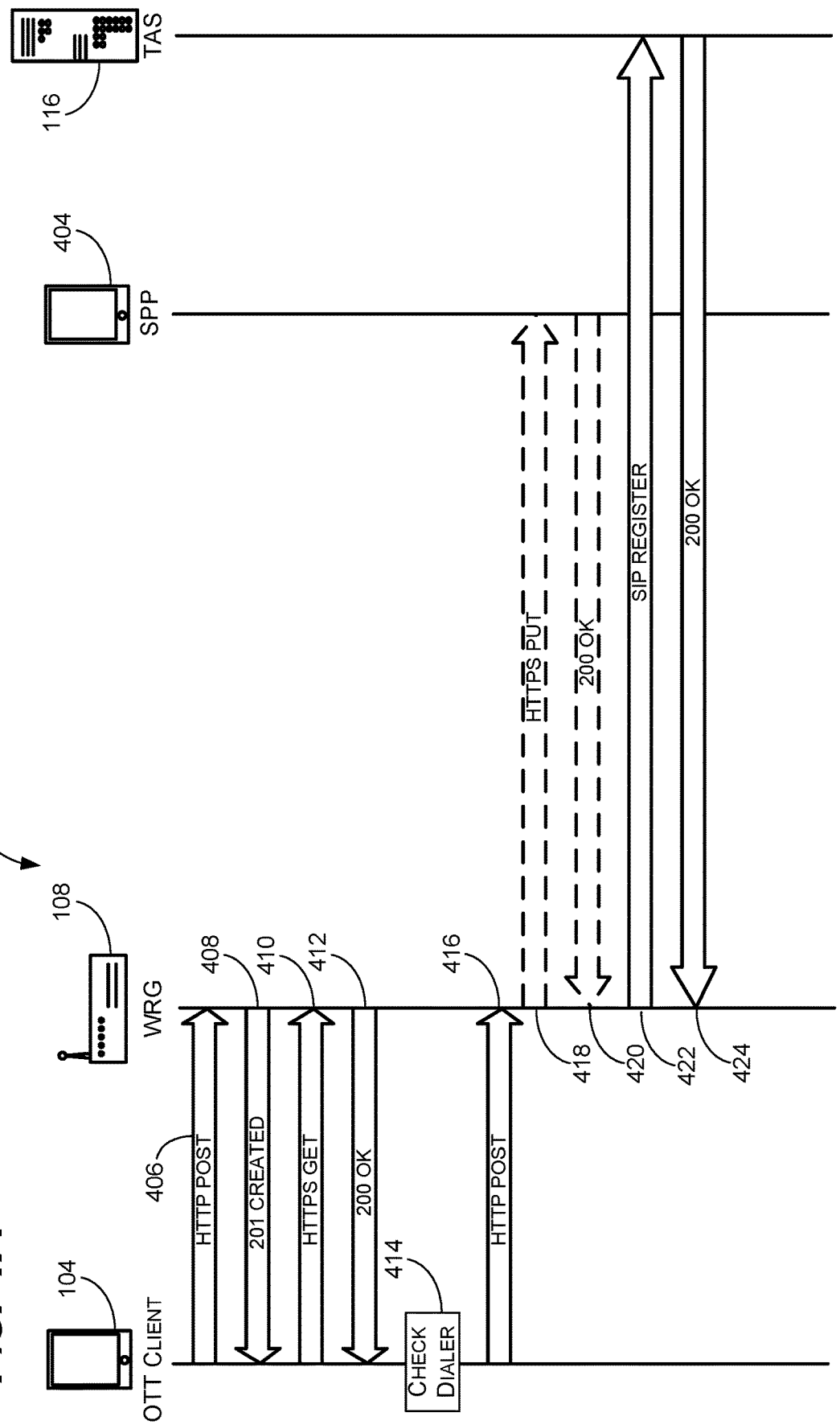

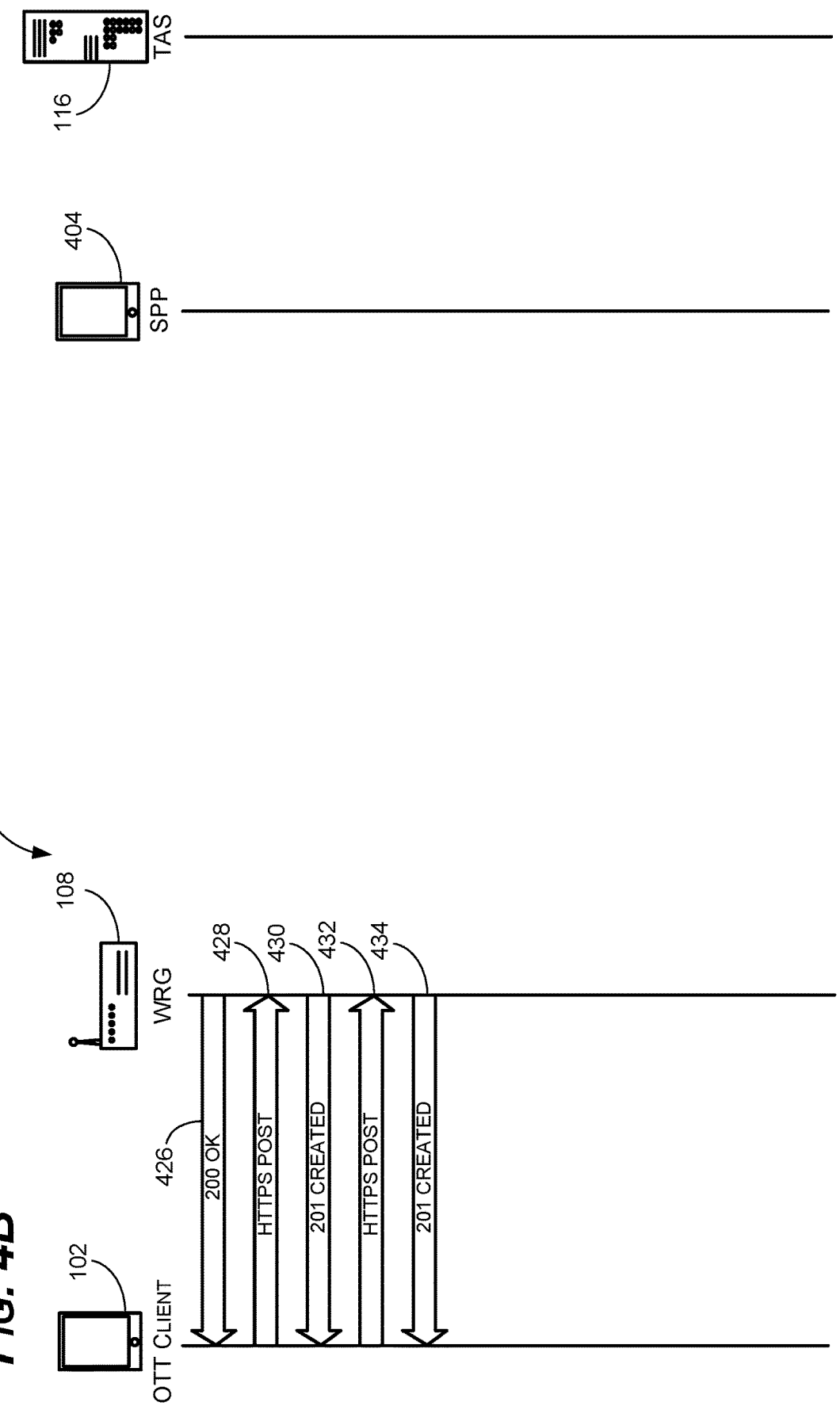

US 11,134,363 B2

SYSTEMS AND METHODS FOR PROVIDING SIM-BASED APPLICATIONS AND SERVICES

BACKGROUND

Cell phones and smartphones, sometimes referred to generically as user equipment (UE), are ubiquitous in modern life. UEs can be used to check e-mail, place cellular- and internet-based calls, maintain calendars, and provide a myriad of other applications. As UEs have added capabilities, however, they have also gotten more complicated and more expensive. And, while cellular providers often subsidize the cost of new UEs, UEs can nonetheless cost from several hundred to over a thousand dollars.

In addition to the cost of a new UE, however, users are sometimes loath to upgrade simply because they do not want to go through the process of switching UEs. This may be because the user does not want to have to transfer their contacts and applications from one UE to another. This may also simply be because the user does not want to have to learn how to use a new UE, which may have a different user interface, among other things—i.e., functions or components of the new UE may work differently, applications and settings may appear in different menus, etc.

Users on average only upgrade their UEs every 3-5 years. This often means that users cannot avail themselves of new features and capabilities created by manufacturers and cellular providers—sometimes because the older UE simply does not have the capability to do so. A UE that does not have a video calling application and/or a camera, for example, cannot make video calls despite the fact that this capability exists on the provider's network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4A and 4B are flowcharts depicting an example of a method for registering a UE connected to a wireless residential gateway (WRG) using a SIM ID, in accordance with some examples of the present disclosure.

DETAILED DESCRIPTION

Examples of the present disclosure can comprise systems and methods for providing enhanced features on a user equipment (UE) using an application and a subscriber identification module identification (SIM ID). The application can register with a network using the SIM ID for identification. The application can then send and receive calls and messages and even provide functionality that is not available natively on the UE. Thus, the application can provide an application dialer, for example, that can coexist with a native dialer on the UE to provide the user with alternatives when making calls. Either one of the application dialer or the native dialer can be set as a default dialer in an OTT application.

The systems and methods discussed herein are discussed generally with respect to cellular UEs and in terms of components (e.g., network entities) associated with fourth-generation (4G) and fifth-generation (5G) cellular networks. The systems and methods can be used with other types of equipment and on other types of networks, however, where users may wish to have increased flexibility in sending and receiving calls, video calls, and messages. Thus, the systems and methods described herein are described in terms of the 4G and 5G networks merely because these networks represent the state of the current art. One of skill in the art will recognize, however, the systems and methods could also be used on other networks that provide video calling such as, for example, Internet of Things (IoT), machine-to-machine (M2M), sixth-generation (6G), and other current and future networks.

As mentioned above, the systems and methods discussed herein can enable a user to register the same SIM ID on both a native device and virtually through an application. Thus, the user may choose to dial a number on a native dialer on the UE to access a cellular voice network, or in another example, may choose to dial a number on a dialer in the application (the "application dialer") to access a cellular or IP data network. The application can also be used to enable the user to access functions that are not natively available on the UE.

Figure 1:
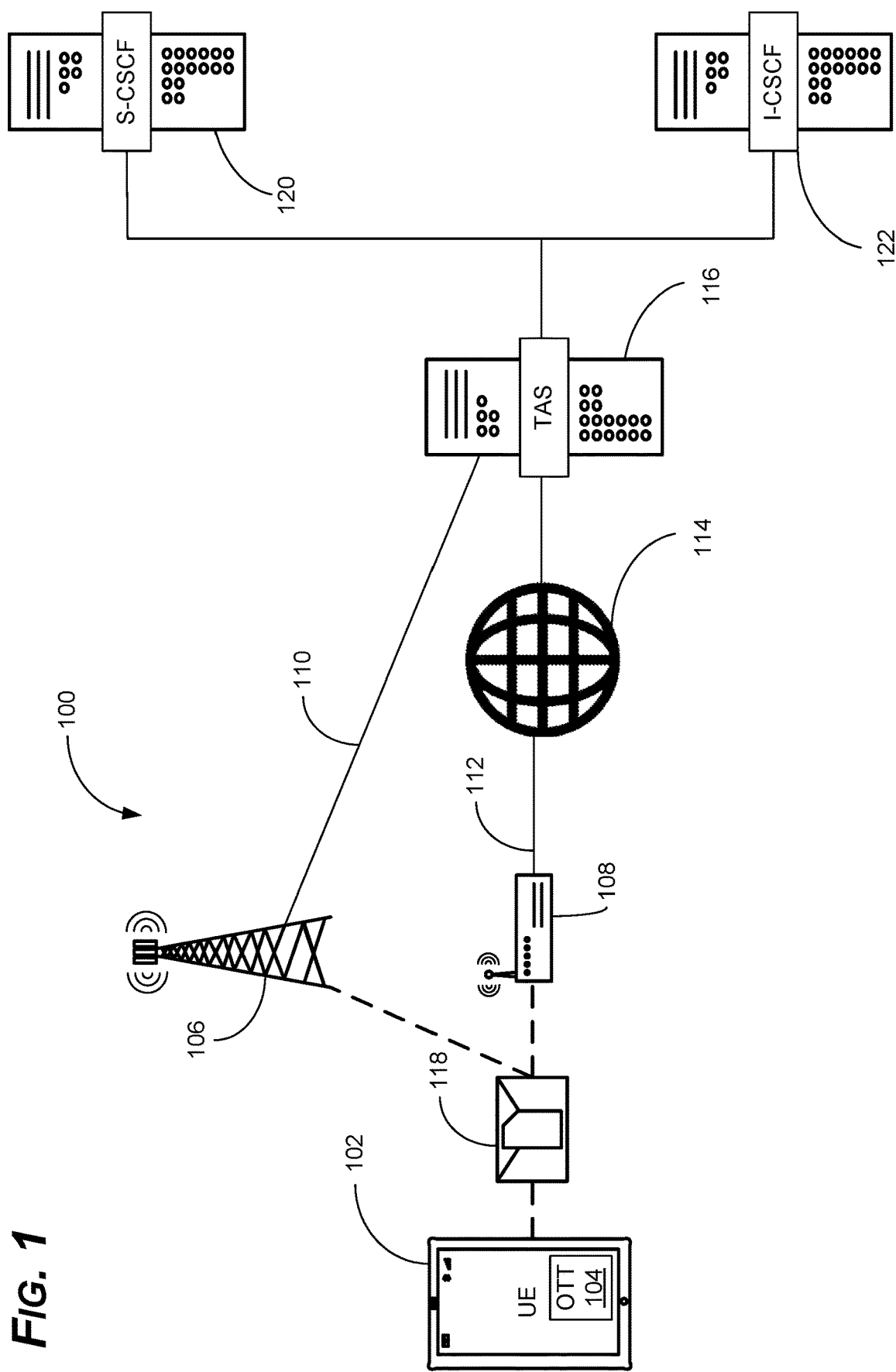
FIG. 1 depicts a system for providing access from multiple networks on the same subscriber identification module identification (SIM ID), in accordance with some examples of the present disclosure.

As shown in FIG. 1, examples of the present disclosure can comprise a system 100 to enable a single SIM ID to be registered in multiple ways on the network. The SIM ID can be used in the traditional manner on a native SIM-based UE such as a cell phone or a tablet computer. The SIM ID can also be used as a virtual phone number or virtual address to enable the UE to access features directly through the application.

To this end, the system 100 can include a UE 102 running an over-the-top (OTT) application 104. As discussed in more detail below, the OTT application 104 can include a dialer (in addition to the native dialer on the UE 102), video calling, e-mail, and other services. The OTT application can enable the UE 102 to register to both internet protocol (IP) and cellular networks using a SIM ID 118 (discussed below)

to provide services that are complementary to, or in addition to, native applications on the UE 102. In other words, the OTT application 104 can provide applications and services that may not otherwise be available on the UE 102 due to technical, or other, limitations associated with the UE 102.

To this end, the UE 102 can be in communication with a cellular wireless base station (WBS) 106 and/or a wireless (Wi-Fi) router, also referred to as a wireless residential gateway (WRG) 108 (the terms "Wi-Fi" and "WRG" are used interchangeably throughout). The WBS 106 can provide the UE 102 with a cellular voice and/or data connection 110. The WRG 108, in turn, can provide the UE 102 with an internet protocol (IP) connection 112 (e.g., via the World Wide Web 114), which can also provide voice—e.g., voice over IP (VOIP)—and data services, among other things.

The UE 102 can use either, or both connections 110, 112 to communicate with an application server (AS) such as a telephony application server (TAS 116, or other communications channels that may be available. The TAS 116 can comprise one or more servers that include software that takes the various methods used for calls and communications, such as text, audio, and video, and makes them available through a single interface. The TAS 116 can include the integration of real-time communication services such as instant messaging, presence information, voice and VOIP, audio, conferencing, and speech recognition with non-real-time communication services such as messaging (e.g., short messaging service (SMS), e-mail, and voicemail). Thus, the TAS 116 can include one or more software products to provide the same user interface (UI) and user experience across multiple devices and media types.

The UE 102 can register with the TAS 116 using the integrated circuit card identification (ICCID), for example, the international mobile subscriber identification (IMSI), mobile station international subscriber directory number (MSISDN) or the user's cellular phone number (collectively, any/all of these numbers are collectively referred to herein as the "SIM ID" 118) of the SIM to register with the TAS 116. The TAS 116 can, in turn, provide applications and services that may or may not be provided in native form on the UE 102.

As one example, the UE 102 may include a native video application (e.g., Facetime® on an iPhone®) that only enables video calls to be placed to other UE with the same application and operating system (OS). Thus, while the UE 102 has the technical capabilities—e.g., a camera and a microphone—the UE 102 may nonetheless be unable to place a call to another type of UE (e.g., an Android® phone) that does not have the same video calling application or that uses a different OS. In this case, the OTT application 104 can enable the user to place a video call within the application using the specific video calling application needed or a video calling application that is agnostic to OS, type of UE, network, etc.

The TAS 116 can use the SIM ID 118 to register the UE 102 with various network entities such as a serving call session control function (S-CSCF) 120 or an interrogating call session control function (I-CSCF) 122. In the example above for video calling, the UE 102 can register with the TAS 116 via the OTT application 104 using the SIM ID 118. The TAS 116, in turn, can register the SIM ID 118 with the S-CSCF 120, for example, to enable the UE 102 to receive calls directed to the SIM ID 118 via the Wi-Fi 108 connection. The TAS 116 may also register with one or more TASs 116 to enable the UE 102 to make the aforementioned "cross-platform" video calls, among other things.

Figure 2:
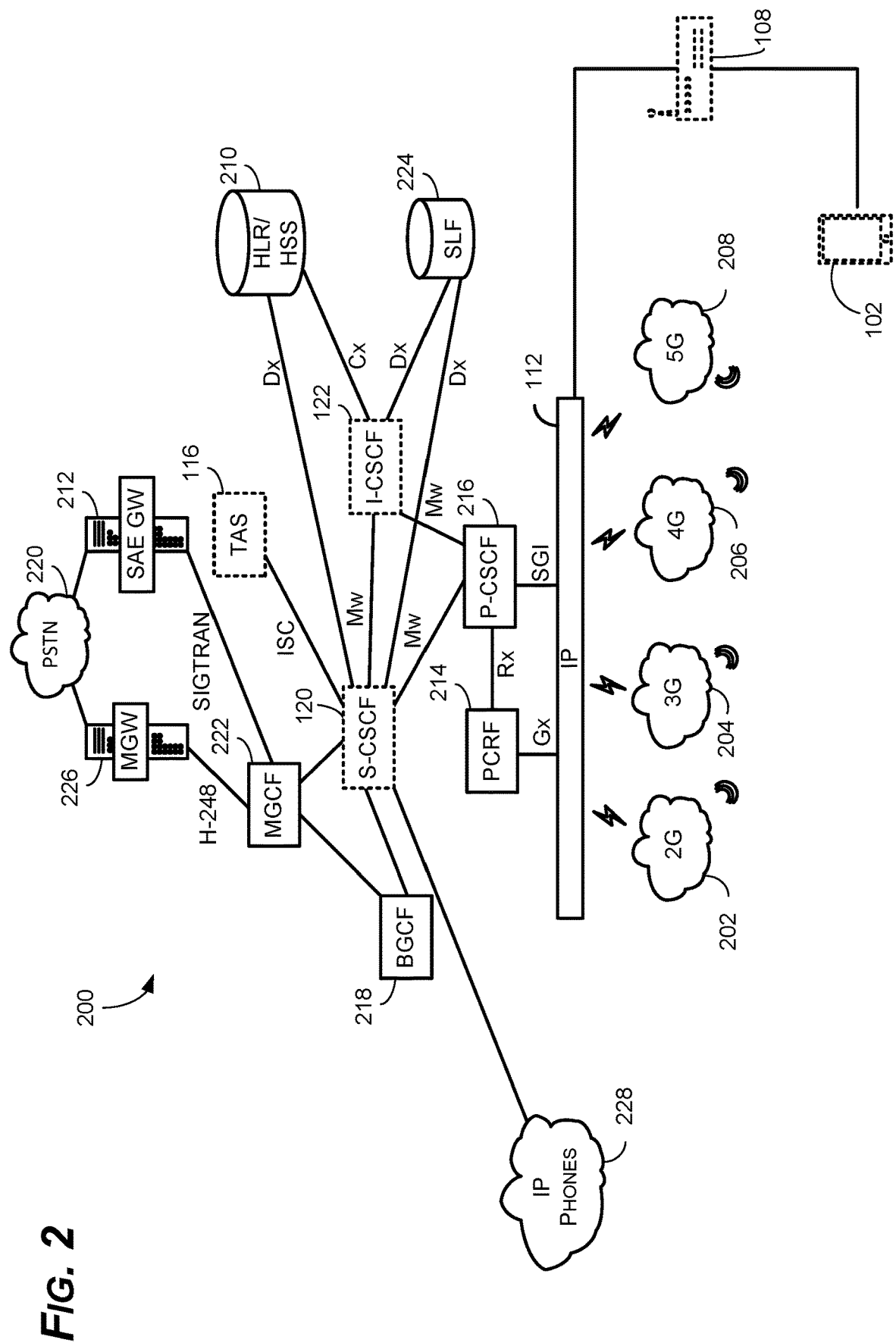
FIG. 2 depicts the system of FIG. 1 in the context of an internet multimedia subsystem (IMS), in accordance with some examples of the present disclosure.

FIG. 2 is an example of the system 100 of FIG. 1 (highlighted by dashed lines) in the context of an internet multimedia subsystem (IMS) 200. As shown, the IMS 200 includes the system 100 and several network components for routing signals, storing subscriber information, and connecting across various subsystems and network types. The IMS 200 is built on the session initiation protocol (SIP) and is the base to further support packaging of voice, video, data, and fixed and mobile services on a single platform to end users. It enables communications across multiple types of networks, including cellular, satellite, broadband, cable, and fixed networks, and enables the creation of efficient interoperating networks.

As shown, the IMS 200 also provides interoperability for the UE 102 and other devices across multiple networks including, for example, 2G 202, 3G 204, 4G 206, 5G 208, Wi-Fi 108, and IP 112 networks. Thus, the IMS 200 provides the interoperability to enable the UE 102 to connect to multiple networks (e.g., the 4G 206 and 5G 208 networks) separately or simultaneously. The UE 102 can connect to the 4G 206 network for some services (e.g., voice and/or video calls), for example, and the Wi-Fi 108 network for other services (e.g., large downloads).

The IMS 200 can also include the TAS 116. The IMS 200 also includes a variety of network entities for providing different services, which can include the S-CSCF 120, I-CSCF 122, and one or more TASs 116. And, while the TAS 116 is shown in FIG. 2 as a single, separate entity, the TAS 116 could be included as part of one or more of the existing IMS 200 entities (e.g., the S-CSCF 120), for example, or on multiple TASs 116.

As mentioned above, the TAS 116 can be an application server configured to conglomerate video and audio calls, text messaging, e-mail, and other services and to provide a consistent UI. As shown in FIG. 2, the TAS 116 can be in communication with the S-CSCF 120, for example, and can provide the SIM ID 118 for the UE 102 to enable the UE 102 to register with the S-CSCF 120 and to provide routing information, SIP signaling, and other functionality.

In some examples, the IMS 200 can also include, for example, a home location register/home subscriber service (HLR/HSS) 210, a service architecture evolution gateway (SAE GW) 212, and a policy and charging rules function (PCRF) 214, among other things. The HLR/HSS 210 is a central database that contains user-related and subscription-related information. The functions of the HLR/HSS 210 include mobility management, call and session establishment support, user authentication, and access authorization. The HSS, which is used for 4G 206 and 5G 208 connections, is based on the previous HLR and authentication center (AuC) from code division multiple access (CDMA) and global system for mobile communications (GSM) technologies, with each serving substantially the same functions for their respective networks.

The HLR/HSS 210 can also serve to provide routing instructions (e.g., IP addresses or phone numbers for various requests), and provide any billing associated with these requests (e.g., to access one network or the other). So, for example, the UE 102 can send a request to place a call via the TAS 116 (as opposed to using the native dialer) to a proxy call session control function (P-CSCF) 216, discussed below, using the SIM ID 118. The P-CSCF 216, in turn, can then provide information to the HLR/HSS 210 with the necessary credentials to enable the UE 102 to access the 4G 206 and/or 5G 208 networks, for example, via the IMS 200. Once authenticated, the HLR/HSS 210 can then ensure the user is authorized to use the services included in the requests (e.g., to make a VOIP call or download a file) or send an authorization request to a third-generation partnership project authentication, authorization, and accounting (3GPP AAA) server, among other things.

The SAE GW 212 routes and forwards user data packets, while also acting as the mobility anchor for the user plane during inter-eNodeB handovers and as the anchor for mobility between 4G 206, 5G 208, and other 3GPP technologies. The SAE GW 212 is also responsible, for example, for terminating the S4 interface and relaying traffic between 2G 202 and 3G 204 systems and the packet data network gateway (PGW). When the UE 102 is in idle state, the SAE GW 212 terminates the downlink data path and triggers paging when downlink data arrives for the UE 102. The SAE GW 212 also manages and stores UE contexts such as, for example, parameters of the IP bearer service and network internal routing information.

The PCRF 214 is a software node that determines policy rules in the overall cellular network, and in the IMS 200 specifically. The PCRF 214 generally operates at the network core and accesses subscriber databases (e.g., via the HLR/HSS 210) and other specialized functions, such as content handling, such as whether the user has sufficient data left in their plan to receive a video call, in a centralized manner. The PCRF 214 is the main part of the IMS 200 that aggregates information between the IMS 200 and other sources. The PCRF 214 can support the creation of rules and then can automatically make policy decisions for each subscriber active on the IMS 200. The PCRF 214 can also be integrated with different platforms like rating, charging, and subscriber databases or can be deployed as a standalone entity.

The IMS 200 also includes the P-CSCF 216. The P-CSCF 216 is the entry point to the IMS 200 and serves as the outbound proxy server for UEs. The UEs attach to the P-CSCF 216 prior to performing IMS registrations and initiating SIP sessions. The P-CSCF 216 may be in the home domain of the IMS operator, or it may be in the visiting domain, where one or more UEs are currently roaming. For attachment to a given P-CSCF 216, the UEs perform P-CSCF 216 discovery procedures. Attachment to the P-CSCF 216 enables the UEs to initiate registrations and sessions with the IMS 200.

The IMS 200 also includes the I-CSCF 122. The I-CSCF 122 acts as an inbound SIP proxy server in the IMS 200. During IMS registrations, the I-CSCF 122 queries the HLR/HSS 210 to select the appropriate S-CSCF 120 which can serve the UE 102. During IMS sessions, the I-CSCF 122 acts as the entry point to terminating session requests. The I-CSCF 122 routes the incoming session requests to the S-CSCF 120 of the called party.

The S-CSCF 120 acts as a registrar server, and in some cases, as a redirect server. The S-CSCF 120 facilitates the routing path for mobile-originated or mobile-terminated session requests. The S-CSCF 120 also interacts with various components for playing tones and announcements, among other things. For the systems and methods discussed herein, the S-CSCF 120 can receive requests from the TAS 116 to register the UE 102 with the SIM ID 118, for example, and establish the appropriate sessions with third-party application servers, the I-CSCF 122, and other entities according to the services requested by the UE 102.

The IMS 200 also includes a breakout gateway control function (BGCF) 218. The BGCF 218 is the IMS 200 element that selects the network in which public switched telephone network (PSTN) 220 (discussed below) breakout is to occur. If the breakout is to occur in the same network as the BGCF 218, for example, then the BGCF 218 selects a media gateway control function (MGCF) 222 (also discussed below) that will be responsible for interworking with the PSTN 220. The MGCF 222 then receives the SIP signaling from the BGCF 218.

The IMS 200 also includes a subscriber location function (SLF) 224. The SLF 224 provides information to the HLR/HSS 210 about the user profile associated with the SIM ID 118. The SLF 224 is generally implemented using a database. If the IMS 200 contains more than one HLR/HSS 210, then the I-CSCF 122 and S-CSCF 120 will communicate with the SLF 224 to locate the appropriate HLR/HSS 210 based on the SIM ID 118.

The IMS 200 also includes the aforementioned TAS(s) 116. As the name implies, TAS(s) 116, sometimes known in a telephony-only context simply as an application server (AS), is a component used to provide telephony applications and additional multimedia functions. The TAS 116116 can include any entity in a telephone network that carries out functions that are not directly related to the routing of messages through the network, such as third-party application servers, and other entities that provide downloads, streaming video, and other services. Such functions can also include, for example, in-network answering machines, automatic call forwarding, conference bridges and other types of applications. And, while shown as a single entity in FIG. 2, multiple TASs 116 are generally used, with each TAS 116116 providing one or more separate services. Based on the services requested by the UE 102 to the S-CSCF 120, for example, the S-CSCF 120 can establish sessions with one or more TASs 116, generally with one TAS 116116 for each service.

The IMS 200 also includes the MGCF 222. The MGCF 222 is a SIP endpoint that handles call control protocol conversion between SIP and ISDN user part (ISUP)/bearer-independent call control (BICC) and interfaces with the SAE GW 212 over stream control transmission protocol (SCTP). The MGCF 222 also controls the resources in a media gateway (MGW) 226 across an H.248 interface. The MGW 226 is a translation device or service that converts media streams between disparate telecommunications technologies such as plain old telephone service (POTS), SS7, next generation networks (2G 202, 3G 204, 4G 206, and 5G 208) or private branch exchange (PBX) systems.

Finally, the IMS 200 also includes the PSTN 220. The PSTN 220 is the world's collection of interconnected voice-oriented public telephone networks, both commercial and government-owned. In some cases, the PSTN 220 can also be referred to as the POTS. With respect to IP phones 228, for example, the PSTN 220 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

Figure 3:
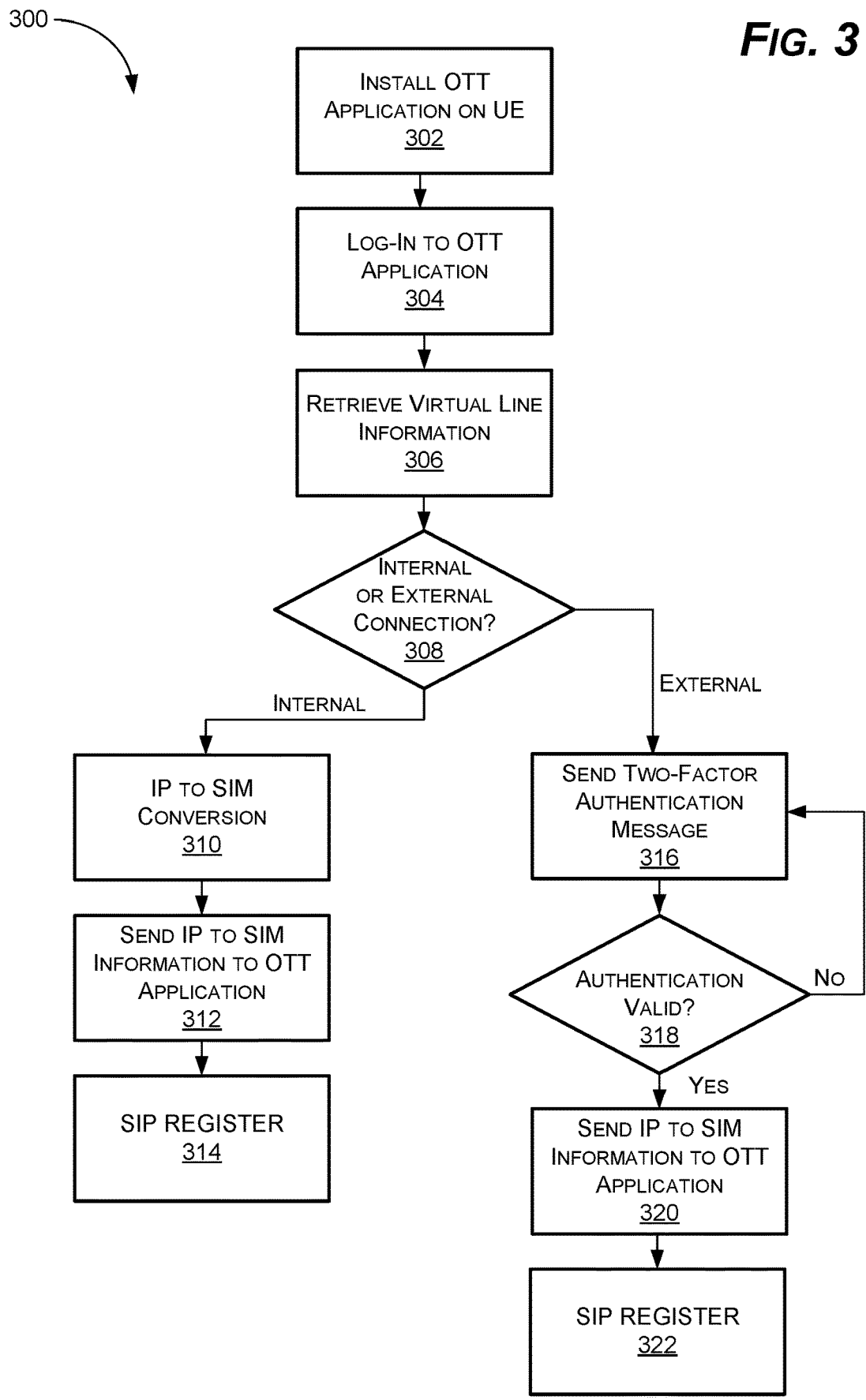
FIG. 3 is a flowchart depicting an example of a method for registering an internally or externally connected UE using the SIM ID, in accordance with some examples of the present disclosure.

As shown in FIG. 3, examples of the present disclosure can comprise a method 300 for registering the SIM ID 118 as a virtual number, or SIM line, within the OTT application 104. Once registered, calls, texts, and other services initiated from, or directed to, the UE 102 can appear in the OTT application 104, native applications on the UE 102, or both. As discussed below, the UE 102 may be asked for different levels of authentication based on whether the UE 102 is connected to an "internal" connection—one provided by the cellular network provider—or an "external" connection—one provided by another cellular network provider, a Wi-Fi 108 connection, etc.

At 302, the user installs the OTT application 104 on a UE 102 with a SIM card, embedded SIM (eSIM), or the like. In some examples, the OTT application 104 can comprise an application installed directly on the UE 102, such as an application provided by the network provider, for example, or an application downloaded from an "app store." In other examples, the OTT application 104 can comprise a web-based application that runs inside a web browser on the UE 102. In this case, the OTT application 104 may not be installed, or even run, on the UE 102. Indeed, the OTT application 104 may be running on a remote server or bank of servers, for example, and merely communicating with the UE 102 via the web browser.

Regardless, at 304, the user can log into the OTT application 104. The user can log into the OTT application 104 using any suitable method such as entering a user ID and password, for example, or using a fingerprint reader. In some examples, such as when the OTT application 104 is provided by the user's cellular provider, the user's login information can be the same as the user's cellular account login and may include the user's cellular phone number, account number, or e-mail address, among other things.

At 306, the OTT application 104 can retrieve the UE's virtual line information associated with the SIM ID 118. The virtual line can be based on the user's cellular phone number, ICCID, IMSI, IMEI, or similar, and can be used in a similar manner as a phone number. In this case, however, the virtual line is delivered virtually via the network instead of using a SIM card. Thus, the OTT application 104 can be in communication with the UE 102 (e.g., the operating system (OS) or transceiver of the UE 102) to retrieve the SIM ID 118 and associate it with the virtual line information.

All that is required for the OTT application 104 to function is a data connection. In some examples, the data connection can be a cellular data connection provided by the user's cellular provider. In other examples, the data connection can be a cellular data connection provided by another cellular provider—e.g., a "roaming" connection. In still other examples, the data connection can comprise a Wi-Fi 108, Ethernet, Bluetooth®, or other wired or wireless network connection.

As mentioned above, as used herein, any data connection with sufficient authentication can be considered an "internal" connection, while connections that need additional authentication can be considered an "external" connection. Thus, a connection provided by the user's cellular provider can be deemed an "internal" connection, for example, because the user has already been authenticated on the network when attaching to the cellular data connection. Connections provided by other cellular providers and connections that may not include sufficient authentication—whether cellular, Wi-Fi, or otherwise—can be deemed an "external" connection and may require additional authentication, as discussed below. To this end, at 308, the method 300 can determine whether the UE 102 is connected to an internal or external data connection.

If the connection is determined to be an internal connection, then at 310, the virtual line associated with the SIM ID 118 can be mapped using IP to SIM conversion. In IP to SIM conversion, a network element (e.g., the TAS 116 or S-CSCF 120) identifies an HTTP REST request coming from the UE 102 via an IP address. A REST, or "representation," is information that is intended to reflect a past, current, or desired state of a given resource, in a format that can be readily communicated via a respective protocol (e.g., HTTP). The REST can consist of a set of representation metadata and a potentially unbounded stream of representation data. See, RFC 7231.

In this case, the initial REST can include a desired state—to associate the IP address with the SIM ID 118—for the given resource—the UE 102. And, because the UE 102 is on an internal connection (in this example), the network entity has, or can, retrieve, the SIM ID 118, IMEI, and other account information associated with the UE 102 (e.g., from the HLR/HSS 210 or similar). The network entity can then associate the IP address with the SIM ID 118 and/or the user's account.

At 312, the network entity sends the information associated with the IP to SIM conversion to the OTT application 104. The information may be provided in the form of a REST response and can include, for example, the user's cell number, e-mail address, or other addresses or IDs to be associated with the SIM ID 118. The REST response can also include default settings such as, for example, whether the OTT application 104 should use the native dialer on the UE 102 or the dialer in the OTT application 104 for voice calls, etc.

At 314, the OTT application 104 can register the virtual line with the network using, for example, a SIP REGISTER. In some examples, the SIP REGISTER can include a custom header indicating that SIM ID 118 is a virtual line associated with the OTT application 104. In some examples, because the UE 102 is connected to the WRG 108 using HTTP, the registration request from the UE 102 to the WRG 108 can comprise a REST request with the virtual line information. The REST request can then be converted by the WRG 108 from a REST request into a SIP REGISTER and can be sent to the TAS 116, which processes the registration. Below is an example of REST request from the OTT application to a Web real-time communications (WebRTC) gateway:

```
POST https://OTTApp.stg.cellprovider.com/racm/v1/
F5478EE307AB52BE36B 7E41EC6C5 B446604
4197D697A2F47D9B9970C862EF5D5/registration
JSON Body
    {
    "registrationInformation": {
      "regInfo": [{
        "msisdn": "9585550100",
        "lineid": "line 1",
        "email": "line1@mail.com",
        "dialPref": "App",
        "isSim": "true",
        "regStatus": {
           "registrationState": "Registered",
           "duration": "600"
        }
      },
      {
        "msisdn": "9585550101",
        "lineid": "line2",
        "email": "line2@mail.com",
        "regStatus": {
           "registrationState": "Registered",
           "duration": "600"
        }
      },
      {
        "msisdn": "9585550102",
        "lineid": "line3",
        "email": "line3@mail.com",
        "regStatus": {
           "registrationState": "Registered",
           "duration": "600"
        }
      }],
```

-continued

```
"appID": "app001",
"appName": "OTT App",
"pushToken": "ghgdfe682-34346-sfafld-46amnvi",
"deviceUUID": "nla90s62-3UUFsd-ddsfg-asbh838",
"serviceName": "WRG",
"osType": "Android 6.0",
"pnsEnabled": "true",
"lifetime": "600",
"clientCorrelator": "12345",
"friendlyName": "000-!%!*WRG-Chrome-Windows"
}
```

In this case, the REST request registers "Line1" with the SIM ID 118—as indicated by "'isSim':'true'". In addition, the dialer for the OTT application 104—as opposed to the native dialer on the UE 102—has been set as the default for Line 1 by "'dialPref':'App'". In this manner, the user can dial out on "line 1" using the dialer from the OTT application 104 over a cellular connection 110 or an IP connection 112 from inside the OTT application 104. In addition, any calls directed to the SIM ID 118 can cause the dialer in the OTT application 104 to ring on the UE 102 in addition to, or instead of, ringing in the native dialer on the UE 102.

At 316, when the UE 102 is connected using an external connection, on the other hand, identification of SIM ID and registration of the virtual line may require additional authentication. In some examples, the user can use two-factor authentication techniques like SMS-based verification. This can enable the OTT application 104 to associate the SIM ID 118, the IP address, and the user's account. To register from an external connection, therefore, the OTT application 104 can provide the SIM ID 118 to the TAS 116, or some other network entity. The TAS 116, or a separate network entity (e.g., 3GPP AAA server), can then send an SMS message to the SIM ID 118 to cause the native messaging application on the UE 102 to display a confirmation message. The user can then confirm the authentication request with a response directly from the native messaging application.

At 318, the TAS 116 can determine whether the two-factor authentication is valid (i.e., was properly authenticated). In some examples, this can comprise verifying a response from the native messaging application or the OTT application 104, such as a public/private key exchange. In other examples, this can comprise verifying a return SMS message from the user—e.g., "Send YES to confirm connection." Of course, other verification methods could also be used.

If the SIM ID 118 in the request cannot be verified, then at 316, in some examples, the TAS 116 may send a second verification message. This may enable the user who accidentally types the wrong response, for example, to have a second chance at verification. In other examples, failure of the two-factor authentication may simply terminate the method 300. In this case, the user may restart the process, for example, or may have to wait a predetermined time period before retrying to prevent "brute force" attacks on the network, among other things.

If the two-factor authentication can be authenticated, on the other hand, then at step 320 the method 300 continues as before. At 320, therefore, the network entity can send the information associated with the IP to SIM conversion to the OTT application 104. At 322, the OTT application 104 can register the virtual line with the network using, for example, a SIP REGISTER. In some examples, the SIP REGISTER can include a custom header indicating that SIM ID 118 is the virtual line associated with the OTT application 104.

The TAS 116 can also define and execute call processing rules based on the REST request(s), network protocols, and other factors. When the OTT application 104 receives the information associated with the IP to SIM conversion, this essentially "syncs" the TAS 116 and the OTT application 104. In the example above, the SIM ID 118 is set to the virtual line and the dialer preference is set to "App" (i.e., the dialer in the OTT application 104). Thus, the TAS 116 can terminate calls (whether audio or video), and the OTT application 104 can receive calls, via the dialer inside the OTT application 104 instead of the native dialer of the UE 102 (i.e., where the SIM ID 118 would have been terminated if not for the OTT application 104 having registered the virtual line with the SIM ID 118).

In some examples, the TAS 116 can optionally be configured to terminate the call simultaneously to the native dialer on the UE 102 and the application dialer within the OTT application 104. In other examples, if the user does not answer the call on the dialer in the OTT application 104, for example, the TAS 116 can retry the call to the native dialer on the UE 102. In still other examples, a configurable delay could be used by the TAS 116 between ringing the dialer in the OTT application 104 and ringing the native dialer on the UE 102. In yet other examples, the call can be terminated in the application dialer and the native dialer at substantially the same time. In any of these cases, the calls terminated to the OTT application 104 can be terminated through web sockets from the aforementioned WebRTC Gateway.

In a similar manner, the information associated with the IP to SIM conversion can also be used for messaging. When a message directed to the SIM ID 118 is received, the user has the option to receive the message in one or both locations. In other words, because the UE is essentially registered twice—once through a native messaging application on the UE 102 and a second time via the OTT application 104—any message sent to the UE 102 can be sent (and received) twice. In some examples, the user can configure whether to terminate messages in one location or the other (i.e., in the native application or the OTT application 104) or can configure messages to sync in both locations. In this configuration, the user may also be given the option to silence the notifications for one of the applications to prevent double notifications, though the message may still be displayed in the silenced application.

The OTT application 104 can also enable the user to change settings dynamically. If the user is in a location with Wi-Fi 108, for example, the user may choose to use some functions (e.g., voice calls, video calls, messaging, etc.) inside the OTT application 104 and others over native applications. To this end, the OTT application 104 can include a graphical user interface (GUI, discussed below with reference to FIG. 10) to enable users to choose their preferences, which can then be configured with the TAS 116 via a SIP REGISTER (which may actually be a re-registration) and/or REST request messages, as discussed above. Thus, in some circumstances, the user may prefer the native phone dialer, for example, if they are concerned about call drops or audio quality. The user may wish to the use the dialer and/or messaging application in the OTT application 104, on the other hand, if they want to use advanced functionalities such as, for example, video calling, call transfers, rich content services (RCS) messaging, etc., that the UE 102 may not support with native applications/components.

As shown in FIGS. 4A and 4B, examples of the present disclosure can include a system 400 for enabling the UE 102 to register with the TAS 116 using the SIM ID 118 to receive communications (e.g., an audio or video call) via the OTT application 104. The communications can be received over a Wi-Fi 108 (or other) connection in addition to, or instead of, a cellular or other connection. This may be useful, for example, when cellular reception is poor, but the UE 102 has a strong Wi-Fi 108 signal.

This may also be useful to enable UEs 102 that do not have a native video calling application, conference calling application, or other application. In this manner, the OTT application 104 can provide the UE 102 with new capabilities. The system 400 can include the UE 102, the OTT application 104, the WRG 108, and the TAS 116. In some examples, the system 400 can also include a serial port protocol (SPP) server 404. The SPP server 404 can provide addition authentication for the UE 102 when, for example, the UE 102 is connected to an external connection, as discussed above.

Initially, the user can log in to the OTT application 104 using a suitable login and/or password. As mentioned above, it may be convenient to use the same login and password as that associated with the user's cellular account. In other examples, the OTT application 104 may use a separate login and password, fingerprint scanning, retina scanning, or any other suitably secure method.

At 406, the UE 102 can send an HTTP POST to the WRG 108 requesting to create a session between the UE 102 and the WRG 108. This can include establishing a notification channel to associate the SIM ID 118 with the IP address of the UE 102, for example, so that the user receives call and message notifications, among other things. This can also include establishing a session ID and a "lifetime" for the session, or how long the session will last.

At 408, the WRG 108 can send a message to the UE 102 to indicate that a session has been created between the UE 102 and the WRG 108. In some examples, this can comprise an HTTP 201 CREATED. The HTTP 201 CREATED can include session information such as, for example, the call-back uniform resource locator (URL), channel URL, client ID, and session lifetime, among other things.

At 410, the UE 102 can request authentication from the WRG 108. In some examples, the UE 102 can send an HTTPS GET to the WRG 108 to request an access token. This may include, for example, a public/private key pair or some other security token suitable to secure the session. At 412, if the UE 102 is authorized to connect to the WRG 108, the WRG 108 can reply with the appropriate access token. In some examples, the WRG 108 can send a 200 OK to both establish the session and to provide the access token in the 200 OK message. At this point, a session has been established between the UE 102 and the WRG 108.

At 414, the UE 102 can confirm the dialer preference and other settings. In other words, because the UE 102 is registering with the SIM ID 118 for use in the OTT application 104, the UE 102 (or the OTT application 104) can provide information related to whether the user has set calls to ring, for example, by default on the native dialer on the UE 102, on the dialer inside the OTT application 104, or both.

At 416, based on this determination, the UE 102 can then send a registration request to the WRG 108. The registration request can comprise, for example, an HTTP POST including the user ID, the access token, device name, OS type, dialer preference (from step 414), and other relevant information.

Optionally, at 418, if the UE 102 is connected to an external connection (as defined above), the WRG 108 can send a request for additional authentication for the UE 102. In some examples, the request can comprise an HTTPS PUT message sent to an SPP server 404. The HTTPS PUT can cause the SPP server 404 to provide additional authentication for the UE 102. In some examples, the SPP server 404 can provide two-factor authentication, such as sending an SMS message authentication to the UE 102. If the proper response is received from the UE 102 at the SPP server 404, then at 420, the SPP server 404 can send a SIP 200 OK, or similar, to the WRG 108 authorizing the UE 102.

At 422, the WRG 108 can send a request to register the UE 102 with the TAS 116. In some examples, this can comprise a SIP REGISTER. The SIP REGISTER can include various information including, for example, the SIM ID 118 and any additional IDs (e.g., e-mail addresses or IP addresses) associated with the UE 102. The SIP REGISTER can also include application settings such as, for example, which application to use for each type of communication (e.g., the OTT application 104 or native application), routing information, and other relevant information. At 424, if all is correct in the SIP REGISTER, the TAS 116 can send a SIP 200 OK registering the SIM ID 118 with the TAS 116.

As shown in FIG. 4B, at 426, the WRG 108 can relay the 200 OK to the UE 102 in an HTTP 200 OK message. The HTTP 200 OK can include any additional registration information provided by the TAS 116. At 428, the UE 428 can send another HTTP POST to the WRG 108. The HTTP POST can create a subscription between the UE 102 and the WRG 108, including the registration status—i.e., that the UE 102 is registered with the TAS 116—and any updated registration information or settings.

At 430, the WRG 108 can respond with an HTTP 201 CREATED indicating that the registered session has been created between the UE 102 and the WRG 108. The HTTP 201 CREATED can include a subscription ID for the session, among other things. At 432, the UE 102 can send an HTTP POST to the WRG 108 using the subscription ID and including the access token, call back URL, and other relevant information. At 434, the WRG 108 can send a HTTP 201 CREATED back to the UE 102 to establish a subscription for the subscription ID and the access token.

At this point, the UE 102 has established a secure session with the WRG 108. In addition, the UE 102 is also registered with the TAS 116 via the WRG 108. As a result, any calls sent from the S-CSCF 120 to the TAS 116, for example, can be rerouted to the UE 102 via the WRG 108. As mentioned above, this routing information can include the SIM ID 118 and any additional IDs that have been registered with the TAS 116. Thus, a communication directed to the SIM ID 118, an e-mail address, an IP address, etc., associated with the SIM ID 118 can be routed by the TAS 116 via the WRG 108 to the UE 102. And, as mentioned above, this may cause an alert in the OTT application 104, a native application, or both.

Figure 5:
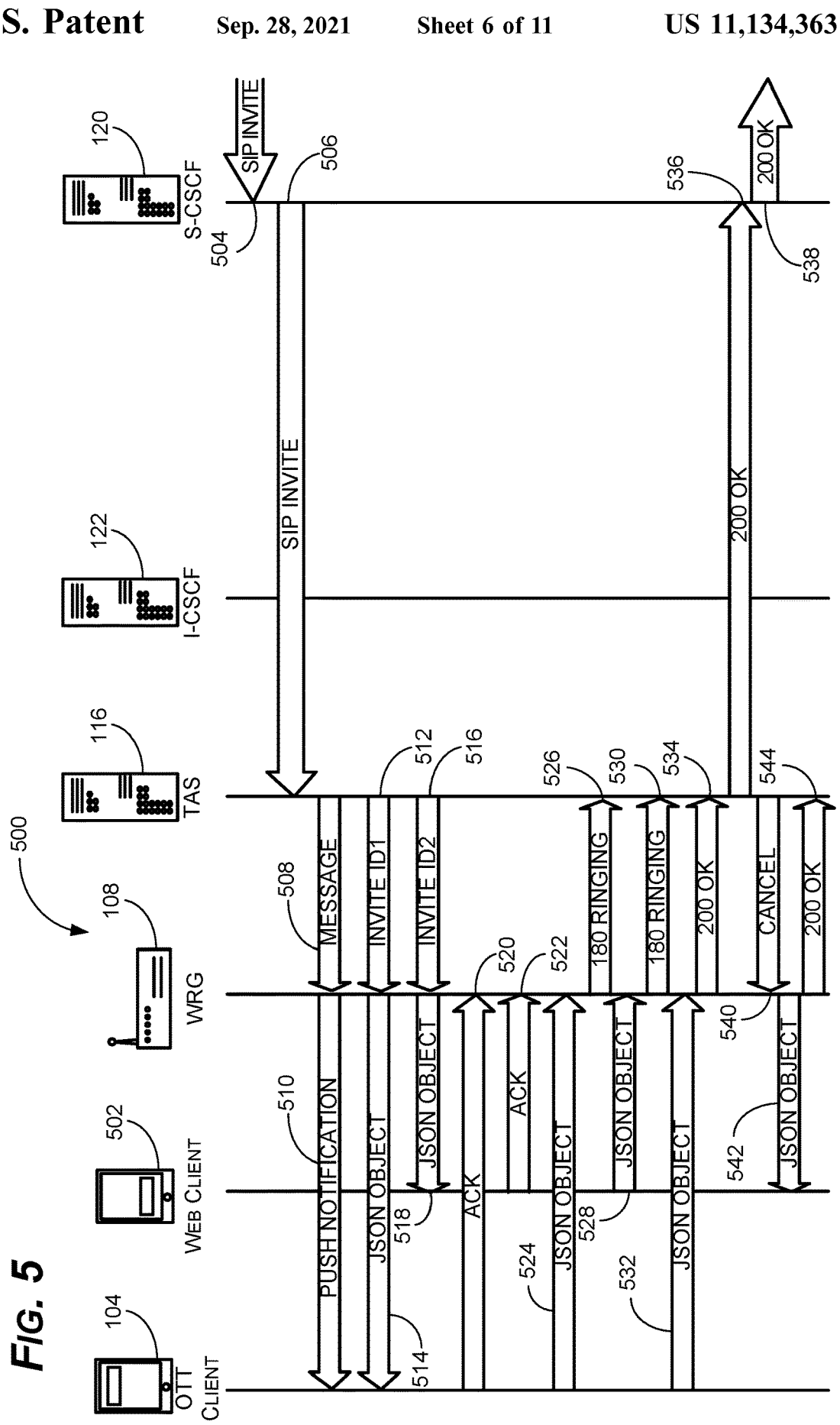
FIG. 5 is a flowchart depicting an example of a method for receiving a cellular call on a UE connected to a WRG, in accordance with some examples of the present disclosure.

As shown in FIG. 5, examples of the present disclosure can also comprise a system 500 for receiving a cellular call at the UE 102 when the UE 102 is connected to a WRG 108. The system 500 displayed below assumes that the registration process between the UE 102 and the TAS 116 has already been completed. As discussed above, because the SIM ID 118 has already been mapped to the IP address or e-mail associated with the SIM ID 118, incoming calls can be properly routed to the UE 102 via the OTT application 104 at the registered IP address and/or directly to the UE 102 via the SIM (e.g., to the native dialer).

At 504, a SIP INVITE is received at the S-CSCF 120 for the SIM ID 118 associated with the UE 102. In this case, however, the TAS 116 has already registered the SIM ID 118 with the S-CSCF 120. As a result, the S-CSCF 120 can route the call to at least the TAS 116 for termination. As mentioned above, in some examples, the S-CSCF 120 may also route the call (e.g., simultaneously, after a delay, or after a certain number of rings) to the native dialer on the UE 102.

At 506, the S-CSCF 120 routes the SIP INVITE to the TAS 116. At 508, based on the registration from the OTT application 104, the TAS 116 generates a message to the WRG 108 from which the OTT application 104 has registered. Instead of an INVITE, however, this initial message may be a page to the OTT application 104 that there is an incoming call.

At 510, the WRG 108 can generate a PUSH notification and send it to the OTT application 104. As the name implies, the PUSH notification can be sent to the OTT application 104 without the OTT application making a request. The PUSH notification may essentially be a page or "wake up" notification to the OTT application 104 that there is an incoming call.

As discussed above with reference to FIG. 3, however, the OTT application 104 can be registered to multiple IDs at the same time. This may include one or more SIM IDs 118, e-mail addresses, user IDs, and so on. To this end, at 512, the TAS 116 can send a first SIP INVITE to the first ID, or "ID1," registered to the SIM ID 118. At 514, the WRG 108 can, in turn, convert and send a Javascript object notation (JSON) message to the OTT application 104. Thus, in this case, ID1 is associated with the SIM ID 118 and has been registered via the OTT application 104.

In this example, the SIM ID 118 has also been registered with a second ID, "ID2," to another address, such as, for example, an e-mail address. As a result, the TAS 116 can also send a second SIP INVITE to a web client 502 (e.g., a browser) on the UE 102. This may be a Skype® application, e-mail application, or similar.

In this example, the user chooses to answer the call via the dialer in the OTT application 104. Thus, at 520, the OTT application 104 sends an acknowledgement, or "ACK," to the WRG 108. The ACK simply acknowledges that the SIP INVITE addressed to ID1 has been received, is properly formatted, and that the OTT application 104 essentially knows what to do with it. Similarly, at 522, the web client 502 can also send an ACK acknowledging the SIP INVITE addressed to ID2.

At 524, the OTT application 104 can send a second JSON OBJECT to the WRG 108. The JSON OBJECT can include information sufficient to inform the WRG 108 that the OTT application 104 is "ringing" and waiting for the user to answer similar to a SIP 180 RINGING. At 526, the WRG 108 can convert the JSON OBJECT to an equivalent SIP message—in this case, a SIP 180 RINGING—and send it to the TAS 116 to inform the TAS 116 that the call is ringing within the OTT application 104.

At 528, the web client 502 also sends a JSON OBJECT to the WRG 108 to inform the WRG 108 that the call is ringing within the appropriate web application. At 530, the WRG 108 again converts this to a SIP 180 RINGING and sends the message to the TAS 116. At this point, the call, which was originally directed to the SIM ID 118, is ringing in two different applications —the OTT application 104 and the web client 502—and may possibly also be ringing on the native dialer of the UE 102 (though the native dialer is not shown in FIG. 5).

In this case, however, the user answers the call in the dialer of the OTT application 104. Thu, the user has selected "accept call" or similar in the UI associated with the OTT application 104. As a result, at 532, the OTT application 104 generates and sends another JSON OBJECT to the WRG 108 accepting the call (i.e., the HTTP equivalent of a SIP 200 OK). At 534, the WRG 108 coverts the JSON OBJECT to SIP and sends a SIP 200 OK to the TAS 116 indicating that the user has accepted the call in the OTT application 104. At 536, the TAS 116 relays the 200 OK to the S-CSCF 120. Finally, the S-CSCF 120 relays the 200 OK to the caller (via the appropriate network entities) and the call is initiated.

Because the call was accepted on the OTT application 104, however, the branch associated with the web client 502 needs to be terminated. To this end, at 540, the TAS 116 sends a SIP CANCEL to the WRG 108 to terminate the call to the web client 502. At 542, the WRG 108 sends a JSON OBJECT to the web client 502 to cancel the call. At 544, the WRG 108 sends a 200 OK to the TAS 116 acknowledging the SIP CANCEL. At this point, the call is connected to the OTT application 104 and the call to the web client 502 has been terminated.

Figure 6:
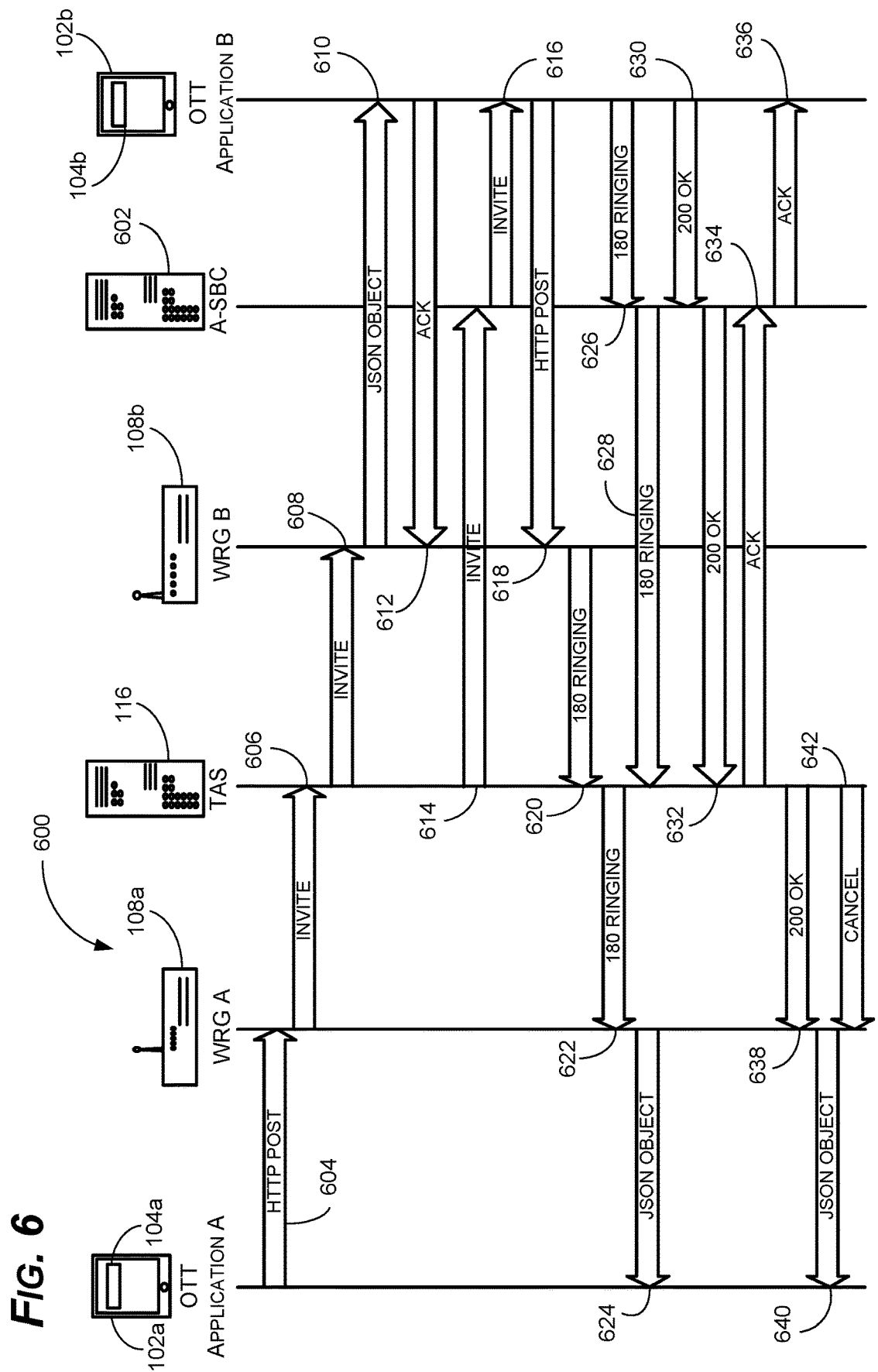
FIG. 6 is a flowchart depicting an example of a method for placing a cellular call from a first UE connected to a first WRG to a second UE connected to a second WRG, in accordance with some examples of the present disclosure.

As shown in FIG. 6, examples of the present disclosure can also comprise a system 600 to enable a first UE, or UE A 102a, to place a call to a second UE, or UE B 102b, who is also using an OTT application 104 and a registered SIM ID 118. The system 600 can enable UE A 102a to attempt the call via multiple channels at the same time via the TAS 116. In this case, the UE A 102a can attempt to connect to UE B 102b via a cellular connection 110 and an IP connection 112. As mentioned above, the user associated with the UE B 102b may then be able to choose whether to answer the call in the native dialer or in the OTT application 104 associated with UE B 102b (OTT application B 104b).

The system 600 can utilize one or more access session border controllers (A-SBCs) 602 to control access and security between the wireless environment and the network provider's network. The system 600 can enable a user to dial a cellular phone number, for example, from UE A 102a connected to a first WRG, or WRG A 108a, and to be connected to UE B 102b that is connected to a second WRG, or WRG B 108b, and a cellular connection. In this case, both UEs 102 can use their respective SIM IDs 118 for communications despite being connected to IP connections 112 instead of, or in addition to, cellular connections 110.

At 604, the OTT application 104 on UE A 102a, or OTT application A 104a, can send an HTTP POST message to WRG A 108a (i.e., the router to which the UE A 102a is connected). The HTTP POST can provide WRG A 108a with the information needed to complete the call and a request to initiate the call. The HTTP POST can include information such as, for example, IP addresses, SIM IDs 118, cellular phone numbers, etc., related to the UE A 102a, UE B 102b, the TAS 116, other network entities, and information related to completing the call to the UE B 102b. The HTTP response to an HTTP POST is normally a program output—in this case a VOIP call—not a static file.

At 606, in response to the HTTP POST, the WRG A 108a generates a SIP INVITE including some, or all, of the information included in the original HTTP POST. The WRG 108a then sends the SIP INVITE to the TAS 116 identified in the HTTP POST. The SIP INVITE may also include information related to WRG A 108a to facilitate return routing of the call to UE A 102a, among other things.

In this example, the TAS 116 has multiple entries, or IDs, associated with the SIM ID 118 for UE B 102b. The IDs can include a cellular phone number, an IP address, an e-mail address, etc. To this end, at 608, the TAS 116 generates and sends a SIP INVITE to WRG B 108b. The information required to send the SIP INVITE can be accessed by the TAS 116 based on a previous registration for UE B 102b, as discussed above, and/or information provided in the initial HTTP POST from UE A 102*a* and the SIP INVITE from WRG A 108*a*.

At 610, in response to the SIP INVITE, WRG B 108*b* generates and sends a JSON OBJECT to OTT application B 104*b*. Based on the setting chosen by the user, this can cause the dialer within OTT application B 104*b*, the native dialer, or both to ring on UE B 102*b*. At 612, OTT application B 104*b* can send an acknowledgement, or ACK, to WRG B 108*b* acknowledging the JSON OBJECT.

At 614, the TAS 116 can also send a SIP INVITE to the A-SBC 602 associated with UE B 102*b*. In some examples, the SIP INVITE can be sent at substantially the same time as the JSON OBJECT. In other examples, the SIP INVITE may be sent after a predetermined delay, number of rings, or other criteria. The SIP INVITE can be addressed to another ID associated with UE B 102*b* that has been registered on, for example, a cellular data or voice network using the same SIM ID 118 included in the original SIP INVITE (discussed above at step 606). In some examples, therefore, the JSON OBJECT discussed above can cause a dialer in OTT application B 104*b* to ring, for example, while the SIP INVITE may cause the native dialer on UE B 102*b* to ring.

The A-SBC 602 is located between the access network (e.g., the network associated with the TAS 116) and the cellular provider's network for UE B 102*b*. The A-SBC 602 can provide SIP messaging, security, network address translation (NAT) Traversal (i.e., ensuring that addressing information from the TAS 116 is valid), and media anchoring, among other things. At 616, if the SIP INVITE from the TAS 116 is properly addressed, formatted, and meets security requirements, therefore, the A-SBC 602 can relay the SIP INVITE to UE B 102*b* via the cellular voice or data network. Thus, the call requested by UE A 102*a* is now being routed via both WRG B 108*b* and the A-SBC 602 either sequentially or substantially simultaneously[1] to UE B 102*b* using two different channels.

[1] At some sufficiently small unit of measure, two signals cannot be sent at exactly the same time. Thus, "substantially simultaneously," as used herein, means "as quickly as is technically feasible," "without a predetermined delay," or similar.

At 618, UE B 102*b* can send an HTTP POST response to the initial JSON OBJECT invite, referred to at step 610. The HTTP POST can include an acknowledgement that the call is ringing on the dialer in OTT application B 104*b*. Thus, the HTTP POST can essentially be the HTTP version of a SIP 180 RINGING. At 620, WRG B 108*b* can convert the HTTP POST into a SIP 180 RINGING and relay the message to the TAS 116.

At 622, the TAS 116 can relay the SIP 180 RINGING to WRG A 108. At 624, WRG A 108*a* can convert the SIP 180 RINGING back into a JSON OBJECT for transmission to UE A 102*a*. As before, the JSON OBJECT can essentially serve the same function as a SIP 180 RINGING, but in the appropriate HTTP format.

At 626, UE B 102*b* can also, or instead, send a SIP 180 RINGING to the A-SBC 602 in response to the SIP INVITE (sent at step 616). The SIP 180 RINGING indicates that the call is also ringing on, for example, the native dialer on UE B 102*b* (or whatever the user has set to ring for cellular-based calls). At 628, the SIP 180 ringing can be relayed to the TAS 116.

At 630, UE B 102*b* sends a SIP 200 OK to the A-SBC 602. The SIP 200 OK indicates that the user of UE B 102*b* accepts the call on the cellular connection (e.g., in the native dialer) instead of in OTT application B 104*b*. At 632, the A-SBC 602 relays the SIP 200 OK to the TAS 116.

At 634, the TAS 116 sends an acknowledgment, or ACK, to the A-SBC 602 acknowledging the SIP 200 OK. At 636, the A-SBC 602 relays the ACK to UE B 102*b*. At 638, the TAS 116 also relays the SIP 200 OK to WRG A 108*a*. At 640, WRG A 108*a* converts the SIP 200 OK to a JSON OBJECT and sends it to UE A 102*a*. This informs UE A 102*a* that the call has been accepted by UE B 102*b*, and may also include additional information such as, how the call was accepted (i.e., in the native dialer) and any return information (e.g., IP addresses, phone numbers, settings, etc.) associated with UE B 102*b*. At this point, the call is established between UE A 102*a* and UE B 102*b* via the cellular-based (data or voice) connection.

At 642, the TAS 116 also sends a SIP CANCEL to WRG A 108*a* to cancel any other legs of the call that are now redundant. In this case, the SIP CANCEL can cancel the call associated with OTT application B 104*b*.

Figure 7:
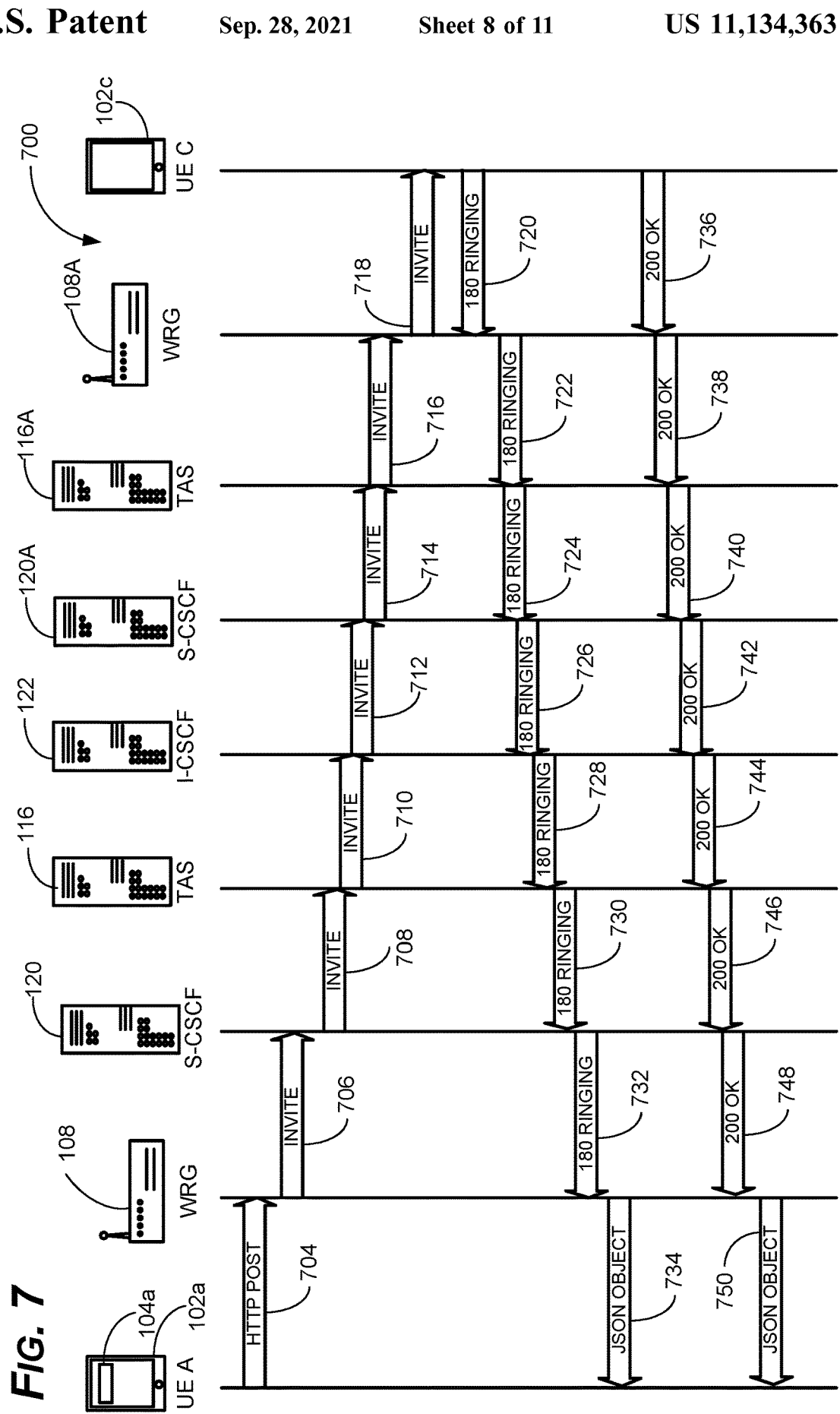
FIG. 7 is a flowchart depicting an example of a method for placing a cellular call from a UE connected to a WRG to a UE with a cellular connection, in accordance with some examples of the present disclosure.

As shown in FIG. 7, examples of the present disclosure can also include a system 700 to enable users to make calls via the OTT application 104 to UEs 102 that are not registered with the TAS 116 or running the OTT application 104. Thus, UE A 102*a* can place a call to UE C 102*c* from the dialer inside the OTT application 104*a*. In this manner, the call is initiated via the WRG 108, but terminated on a cellular connection. In this example, the call can be routed from the WRG 108 to the TAS 116 and then through standard cellular channels from the I-CSCF 122 to the IMC 702 (which can comprise the S-CSCF 120 and P-CSCF 216) and then to UE C 102*c*.

At 704, as before, UE A 102*a* can send an HTTP POST to the WRG 108. The HTTP POST can include information about UE A 102*a*, UE C 102*c*, the TAS 116, and any other information relevant to completing the call. At 706, the WRG 108 can convert the HTTP POST to an equivalent SIP INVITE and relay the request to the S-CSCF 120 for the UE A 102*a*. At 708, the S-CSCF 120 for the UE A 102*a* transmits the SIP INVITE to the TAS 116.

In this case, however, the SIM ID 118 associated with UE C 102*c* is not registered with the TAS 116. As a result, the TAS 116 simply attempts to terminate the call as if the call was a standard cellular voice call. To this end, at 710, the TAS 116 can relay the INVITE to the appropriate I-CSCF 122 for UE C 102*c*. In some examples, because the I-CSCF 122 is generally at the edge of the cellular network, the network can also include an interconnect session border controller (I-SBC), which may be combined with the I-CSCF 122 or a separate network entity. The I-SBC addresses the boundary requirements where service provider networks interconnect and exchange inbound and outbound SIP sessions, such as the present SIP INVITE. The I-SBC can integrate three IMS functions, commonly referred to as the interconnect border control function (IBCF), the interworking function (IWF), and the transition gateway (TrGW). The IBCF is used as gateway to external networks and provides network address translation (NAT) and firewall functions. The IBCF is a session border controller specialized for the network-to-network interface (NNI).

At 712, the I-CSCF 122, in turn, can locate the appropriate S-CSCF 120 and/or P-CSCF 216 (collectively referred to as the IP Multimedia Core Network Subsystem (IMS) Controller (IMC) 702 for UE C 102*c* and transmit the SIP INVITE to a S-CSCF 120A for the UE C 102*c*. As mentioned above, in some examples, the correct entities can be located by the I-CSCF 122 by sending a query to the HLR/HSS 210. Once located, at 710, the I-CSCF 122 can relay the SIP INVITE to the appropriate IMC 702. The IMC 702, in turn includes the appropriate S-CSCF 120A and/or P-CSCF 216 to route the SIP INVITE to UE C 102*c*. At 714, the SIP INVITE is relayed to the TAS 116A associated with the UE C 102*c*. At 716, the SIP INVITE is relayed from the TAS 116A to a WRG 108A associated with the UE C 102*c*, and then at 718, the SIP INVITE is relayed to UEC 102*c*.

At 720, UE C 102*c* can send a SIP 180 RINGING back to the WRG 108A to indicate that the SIP INVITE has been received and understood and that UE C 102*c*—in this case most likely on the native dialer—is ringing. At 722, the SIP 180 RINGING is relayed from the WRG 108A to the TAS 116A. At 724, the SIP 180 RINGING is relayed to S-CSCF 120A. At 726, the SIP 180 RINGING is relayed to the I-CSCF 122, at 728 to the TAS 116, at 730 to the S-CSCF 120, and then at 732 to the WRG 108.

At this point, the SIP 180 RINGING can be converted from a SIP message to an HTTP message. This is because, as mentioned above, UE A 102*a* is utilizing the WRG 108 and an IP connection, as opposed to, for example, a cellular connection 110. Thus, the WRG 108 converts the SIP 180 RINGING into an equivalent JSON OBJECT. At 734, the WRG 108 sends the JSON object to UE A 102*a* to inform UE A 102*a* that the call is ringing on UE C 102*c*. The OTT application 104*a* on UE A 102*a* may provide a ringing sound, a flashing icon or light, or similar, to inform the user of same.

At 736, the call is accepted on UE C 102*c*, which causes UE C 102*c* to send a SIP 200 OK to the WRG 108A. Similar to the above, the SIP 200 OK can be relayed back through the networks to UE A 102*a*. Thus, the 200 OK is relayed to the TAS 116A at 738, the S-CSCF 120A at 740, the I-CSCF 122 at 742, the TAS 116 at 744, the S-CSCF 120 at 746, and the WRG 108 at 748.

Again, the SIP 180 200 OK can be converted from a SIP message to an HTTP message. Thus, the WRG 108 converts the SIP 200 OK into an equivalent JSON OBJECT. At 750, the WRG 108 sends the JSON object to UE A 102*a* and the call is connected from UE A 102*a* to UE C 102*c*. In some examples, UE A 102*a* may send an ACK or a SIP 200 OK (not shown) acknowledging the connection, though this is not strictly necessary. At this point, UE A 102*a*, on an IP connection 112, is connected via the WRG 108 to UE C 102*c*, on a cellular connection 110, using the SIM ID 118 associated with UE A 102*a*. Indeed, on UE C 102*c* it simply appears as if UE A 102*a* is calling from a cell phone to a cell phone in the conventional manner—e.g., the caller ID appears the same—because UE A 102*a* is using the same SIM ID 118 regardless of the call routing path.

Figure 8:
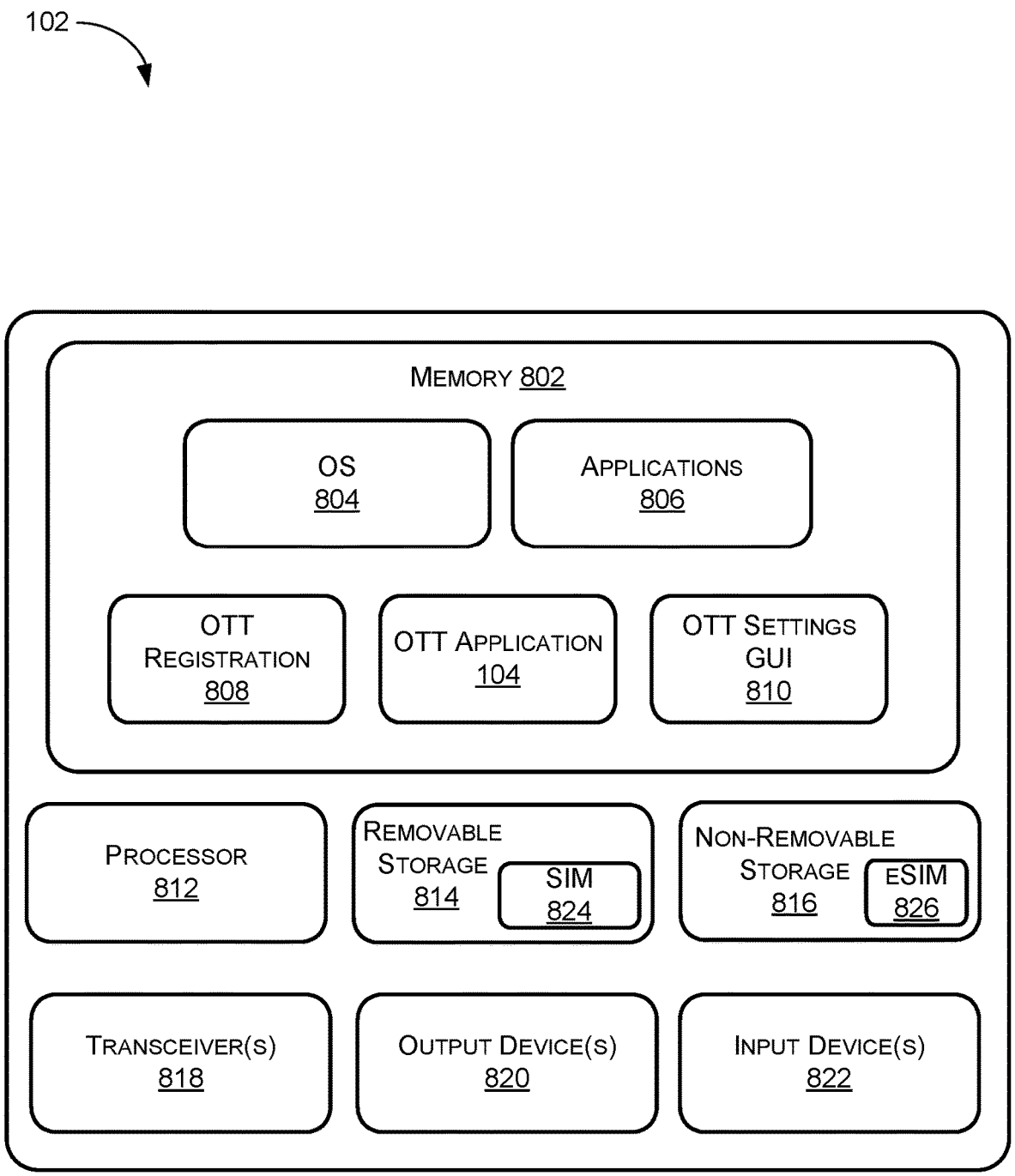
FIG. 8 is an example of a UE for use with the systems and methods disclosed herein, in accordance with some examples of the present disclosure.

FIG. 8 depicts a component level view of a UE 102 (e.g., UE A 102*a*, UE B 102*b*, or UE C 102*c*) for use with the systems and methods described herein. The UE 102 could be any UE capable of making audio and/or video calls on the cellular network 110, the IMS 200, and/or IP networks 112 (discussed above). For clarity, the UE 102 is described herein generally as a cell phone, smart phone, or laptop computer. One of skill in the art will recognize, however, that the systems and methods described herein can also be used with a variety of other electronic devices, such as, for example, tablet computers, desktops, and other network (e.g., cellular 110 or IP 112 network) connected devices. Indeed, the UE 102 can be any device that can send and receive video calls, audio calls, and/or messaging that can benefit from improved call management.

The UE 102 can comprise several components to execute the above-mentioned functions. As discussed below, the UE 102 can comprise memory 802 including an OS 804 and one or more standard applications 806. The standard applications 806 can include many features common to UEs such as, for example, calendars, call logs, voicemail, etc. In this case, the standard applications 806 can also comprise a video call application (e.g., Facetime®), an audio call application, and a messaging application to enable users to engage in audio calls, video calls, and messaging, among other things. The standard applications 806 can also include contacts to enable the user to select a contact to initiate, for example, a video call, audio call, text message, etc.

The UE 102 can also comprise the OTT application 104, OTT registration 808, and an OTT settings GUI 810 (discussed below with reference to FIG. 10). As mentioned above, the OTT application 104 can enable the user to utilize a single SIM ID 118 to access multiple functions (e.g., voice calls) on both the cellular 110 an IP 112 networks. The OTT application 104 can include dialers, messaging applications, and other features instead of, or in addition to, the standard applications 806 on the UE 102. As mentioned above, the UE 102 may include a native video calling application (e.g., Facetime®), while the OTT application 104 provides an additional video calling application (e.g., Google Hangouts®). This can enable the user to participate in video calls with both iOS devices and Android devices, for example.

OTT registration 808 can comprise an application to enable the user to register the SIM ID 118 with the TAS 116 for use in the OTT application 104. As such, OTT registration 808 can comprise a separate module or can be part of the OTT application 104. OTT registration 808 can also enable the user to register additional IDs to the SIM ID 118 to provide multiple routing paths for various functions (voice calls, video call, messaging, etc.). Thus, OTT registration 808 can enable the user to register the SIM ID 118, an e-mail address, a phone number, an IP address, or other valid identification that can be associated with the user's account and SIM ID 118 and accessed by the OTT application 104.

The UE 102 can also comprise an OTT settings GUI 810. The OTT settings GUI 810 can enable the user to control how certain features are handled. The user can configure all outgoing video calls to be handled in a video calling application inside the OTT application 104, for example, but all incoming video calls can be handled on the native video calling application on the UE 102. Similarly, the user can set all incoming voice calls to ring in the native dialer on the UE 102, in a dialer included in the OTT application 104, or both (either sequentially or simultaneously). The OTT settings GUI 810 can also enable the user to dynamically switch back and forth between using the standard applications 806 and the OTT application 104 for various functions. The OTT settings GUI 810 is discussed in more detail below with respect to FIG. 10.

The UE 102 can also comprise one or more processors 812 and one or more of removable storage 714, non-removable storage 816, transceiver(s) 818, output device(s) 820, and input device(s) 822. In some examples, such as for cellular communication devices, the UE 102 can also include a SIM 824 and/or an embedded SIM (eSIM) 826, which can include a mobile country code (MCC), mobile network code (MNC), international mobile subscriber identity (IMSI), cellular phone number, and other relevant information—some, or all, of which can be associated with the SIM ID 118. In some examples, one or more of the functions (e.g., standard applications 806 and/or the OTT settings GUI 810) can be stored on the SIM 824 or the eSIM 826 in addition to, or instead of, being stored in the memory 802.

In various implementations, the memory 802 can be volatile (such as random access memory (RAM)), non-volatile (such as read only memory (ROM), flash memory, etc.), or some combination of the two. The memory 802 can include all, or part, of the applications 104, 806, 808; GUI 810; and the OS 804 for the UE 102, among other things. In some examples, rather than being stored in the memory 802, some, or all, of the applications 104, 806, 808; GUI 810; and the OS 804, and other information (e.g., call history, contacts, etc.) can be stored on a remote server or a cloud of servers accessible by the UE 102 such as the TAS 116 or a TAS 116.

The memory 802 can also include the OS 804. Of course, the OS 804 varies depending on the manufacturer of the UE 102 and currently comprises, for example, iOS 11.4.1 for Apple products and Pie for Android products. The OS 804 contains the modules and software that support a UE's basic functions, such as scheduling tasks, executing applications, and controlling peripherals. In some examples, the OS 804 can enable the OTT application 104 and native applications to conduct voice and video calls, send and receive messages, and provide other functions, as described above, via the transceiver(s) 818. The OS 804 can send information to the GUI 810, for example, to cause the GUI 810 to display a list of applications and provide various settings. The OS 804 can also receive inputs from the GUI 810 to cause the UE 102 to use the standard applications 806 for some functions, while other functions are handled in the OTT application 104, among other things. The OS 804 can also enable the UE 102 to send and retrieve other data via a cellular connection 110 or IP connection 112 and perform other functions.

The UE 102 can also comprise one or more processors 812. In some implementations, the processor(s) 812 can be a central processing unit (CPU), a graphics processing unit (GPU), both CPU and GPU, or any other processing unit. The UE 102 may also include additional data storage devices (removable and/or non-removable) such as, for example, magnetic disks, optical disks, or tape. Such additional storage is illustrated in FIG. 8 by removable storage 814 and non-removable storage 816. The removable storage 814 and non-removable storage 816 can store some, or all, of the applications 104, 806, 808; GUI 810; and the OS 804.

Non-transitory computer-readable media may include volatile and nonvolatile, removable and non-removable tangible, physical media implemented in technology for storage of information, such as computer readable instructions, data structures, program modules, or other data. The memory 802, removable storage 814, and non-removable storage 816 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the UE 102. Any such non-transitory computer-readable media may be part of the UE 102 or may be a separate database, databank, remote server, or cloud-based server.

In some implementations, the transceiver(s) 818 include any transceivers known in the art. In some examples, the transceiver(s) 818 can include wireless modem(s) to facilitate wireless connectivity with other components (e.g., between the UE 102), the Internet, and/or an intranet via the cellular 110 and IP 112 networks. Specifically, the transceiver(s) 818 can include one or more transceivers that can enable the UE 102 to send and receive video calls, audio calls, and messages and to perform other functions. Thus, the transceiver(s) 818 can include multiple single-channel transceivers or a multi-frequency, multi-channel transceiver to enable the UE 102 to send and receive video calls, audio calls, messaging, etc. The transceiver(s) 818 can enable the UE 102 to connect to multiple networks including, but not limited to the 2G 202, 3G 204, 4G 206, 5G 208, and Wi-Fi 108 networks. The transceiver(s) can also include one or more transceivers to enable the UE 102 to connect to future (e.g., 6G) networks, Internet-of-Things (IoT), machine-to machine (M2M), and other current and future networks.

The transceiver(s) 818 may also include one or more radio transceivers that perform the function of transmitting and receiving radio frequency communications via an antenna (e.g., Wi-Fi 108 or Bluetooth®). In other examples, the transceiver(s) 818 may include wired communication components, such as a wired modem or Ethernet port, for communicating via one or more wired networks. The transceiver(s) 818 can enable the UE 102 to make audio and video calls, download files, access web applications, and provide other communications associated with the systems and methods, described above.

In some implementations, the output device(s) 820 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen, or display, on which the GUI 810 can be displayed. The output device(s) 820 can also include speakers, or similar devices, to play sounds or ringtones when an audio call or video call is received. The output device(s) 820 can also provide different tones or sounds when a call is received in a standard application 806 and when a call is received in the OTT application 104, for example, or when other tasks associated with the systems and methods described herein are initiated or completed. Output device(s) 820 can also include ports for one or more peripheral devices, such as headphones, peripheral speakers, or a peripheral display.

In various implementations, input device(s) 822 include any input devices known in the art. For example, the input device(s) 822 may include a camera, a microphone, or a keyboard/keypad. The input device(s) 822 can include a touch-sensitive display or a keyboard to enable users to enter data and make requests and receive responses via web applications (e.g., in a web browser), make audio and video calls, and use the standard applications 806, among other things. The input device(s) 822 can also enable the user to change setting in the GUI 810 related to whether certain functions are carried out in the standard applications 806, the OTT application 104, or both. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can be used to display the GUI 810, for example, and to act as both an input device 822 and an output device 820.

Figure 9:
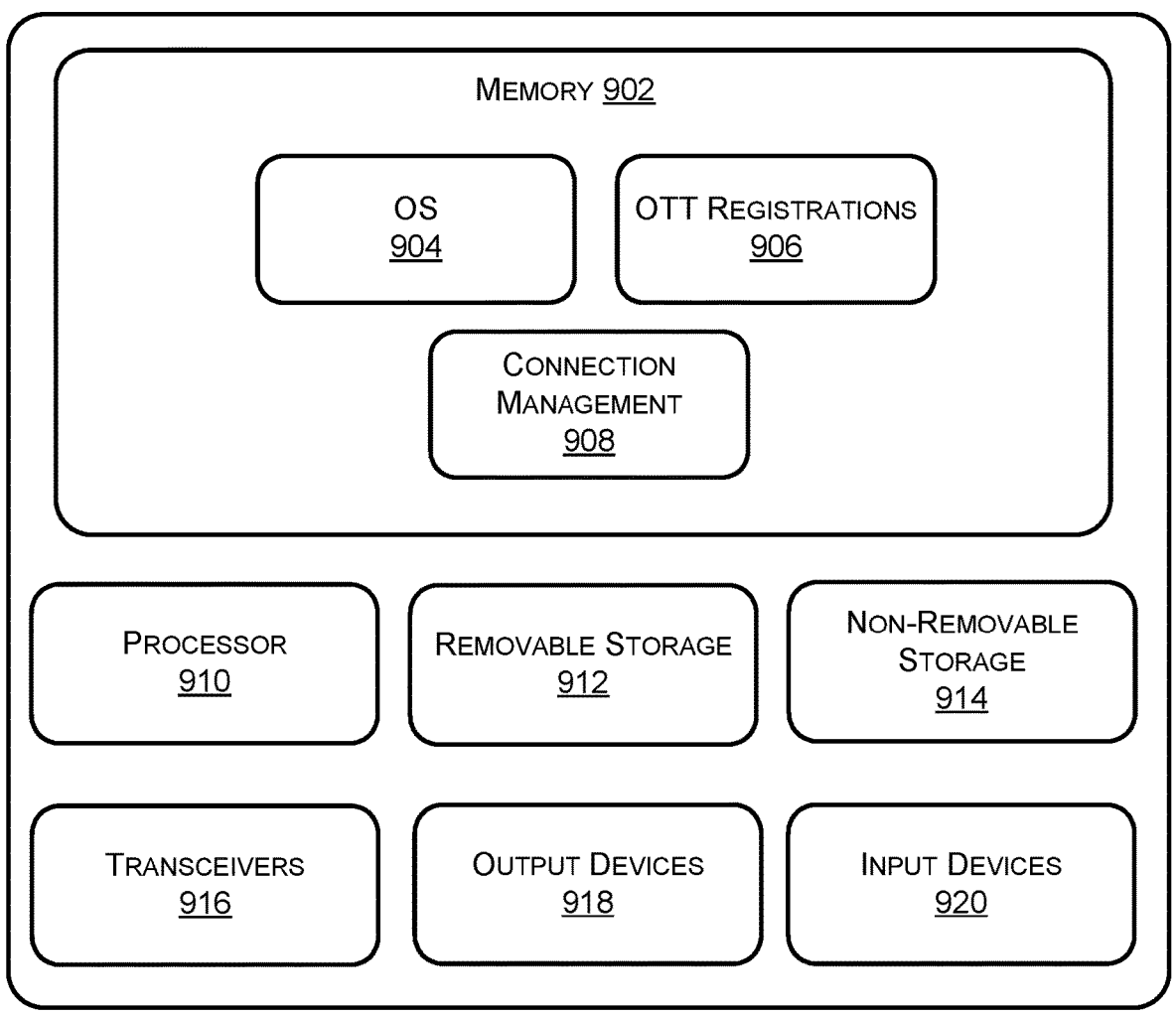
FIG. 9 is an example of a telephony application server (TAS) for use with the systems and methods disclosed herein, in accordance with some examples of the present disclosure.

As shown in FIG. 9, the systems and methods discussed herein can also be used in conjunction with the TAS 116. To simplify the discussion, the TAS 116 is discussed below as a standalone server. One of skill in the art will recognize, however, that the systems and methods disclosed herein can also be implemented partially, or fully, on an existing network entity such as, for example, the HLR/HSS 210, a 3GPP AAA, or on another existing network entity. Thus, the discussion below in terms of the TAS 116 is not intended to limit the disclosure to the use of a standalone server. The TAS 116 can be, for example, capable of connecting with multiple UEs 102 (e.g., UE A 102a, UE B 102b, and UE C 102C), providing video and/or audio calling, messaging, and performing other functions, as discussed above.

The TAS 116 can comprise a number of components to execute part, or all, of the above-mentioned systems and methods. The TAS 116 can comprise memory 902 including, for example, an OS 904, OTT registrations 906, and connection management 908. In various implementations, the memory 902 can be volatile (such as RAM), non-volatile (such as ROM, flash memory, etc.), or some combination of the two. The memory 902 can include all, or part, of the applications 906, 908 and the OS 904 for the TAS 116, among other things.

The OS 904 can vary depending on the manufacturer of the TAS 116 and the type of component. Many servers, for example, run Linux or Windows server. Dedicated cellular routing servers may run specific telecommunications OSs. The OS 904 contains the modules and software that supports a computer's basic functions, such as scheduling tasks, executing applications, and controlling peripherals. The OS 904 can enable the TAS 116 to send and receive SIP and HTTP messages, connect with UEs, route calls and messages, etc. Thus, the OS 904 can also enable the TAS 116 to perform some, or all, of the functions associated with the systems and methods discussed herein.

In some examples, the memory 902 can also include OTT registrations 906. As mentioned above, UEs 102 using the OTT application 104 can register their respective SIM IDs 118 with the TAS 116 to perform various function inside the OTT application 104 instead of, or in addition to, the standard applications 806 on the UE 102. To this end, OTT registrations 906 can include a directory including a plurality of SIM IDs 118 for multiple UEs 102 mapped to one or more relevant IDs. Thus, a SIM ID 118 may be registered to multiple phone numbers, e-mail addresses, IP addresses, etc. The TAS 116 can then effect routing from cellular network entities, for example, to UEs 102 based on these registrations.

In some examples, the memory 902 can also include connection management 908. Connection management 908 can enable the TAS 116 to receive communications and route the communications, as necessary, based on the OTT registrations 906. When a voice call is received on any registered SIM ID 118 (e.g., the user's cell phone number), the TAS 116 can determine that the UE 102 is currently connected to a WRG 108, for example, and the SIM ID 118 is currently registered under an IP address. The TAS 116 can then route the call to the IP address using HTTP instead of, or in addition to, routing the call using SIP messages to the cellular number.

The TAS 116 can also comprise one or more processors 910. In some implementations, the processor(s) 910 can be a central processing unit (CPU), a graphics processing unit (GPU), both CPU and GPU, or any other processing unit. The TAS 116 can also include one or more of removable storage 912, non-removable storage 914, transceiver(s) 916, output device(s) 918, and input device(s) 920.

The TAS 116 may also include additional data storage devices (removable and/or non-removable) such as, for example, magnetic disks, optical disks, or tape. Such additional storage is illustrated in FIG. 9 by removable storage 912 and non-removable storage 914. The removable storage 912 and non-removable storage 914 can store some, or all, of the OS 904 and other applications 906, 908.

Non-transitory computer-readable media may include volatile and nonvolatile, removable and non-removable tangible, physical media implemented in technology for storage of information, such as computer-readable instructions, data structures, program modules, or other data. The memory 902, removable storage 912, and non-removable storage 914 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the TAS 116. Any such non-transitory computer-readable media may be part of the TAS 116 or may be a separate database, databank, remote server, or cloud-based server.

In some implementations, the transceiver(s) 916 include any transceivers known in the art. In some examples, the transceiver(s) 916 can include wireless modem(s) to facilitate wireless connectivity with multiple UEs (e.g., UE 102), the Internet, the cellular network, and/or an intranet via a cellular connection. The transceiver(s) 916 may enable the TAS 116 to connect with the UEs on multiple networks (e.g., the 2G 202 3G 204, 4G 206, 5G 208, and Wi-Fi 108 networks). The transceiver(s) 916 can comprise multiple single frequency transceivers or one or more multi-frequency/multi-channel transceivers to enable the TAS 116 to communicate with tens, hundreds, or even thousands of UEs simultaneously. The transceiver(s) 916 can also enable the TAS 116 to receive communications in one format (e.g., HTTP on the IP network 112), but relay the communication in another format (e.g., SIP messaging on the 4G network 206).

The transceiver(s) 916 may include a radio transceiver that performs the function of transmitting and receiving radio frequency communications via an antenna (e.g., Wi-Fi 108 or Bluetooth®) to connect to the IP network 112 or another network. In other examples, the transceiver(s) 916 may include wired communication components, such as a wired modem or Ethernet port.

In some implementations, the output device(s) 918 include any output devices known in the art, such as a display (e.g., a liquid crystal or thin-film transistor (TFT) display), a touchscreen display, speakers, a vibrating mechanism, or a tactile feedback mechanism. In some examples, the output device(s) 918 can play various sounds based on, for example, when a UE 102 is registered, deregistered, or changes an option in the OTT application 104. Output device(s) 918 can also include ports for one or more peripheral devices, such as headphones, peripheral speakers, or a peripheral display.

In various implementations, input device(s) 920 include any input devices known in the art. For example, the input device(s) 920 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 10:
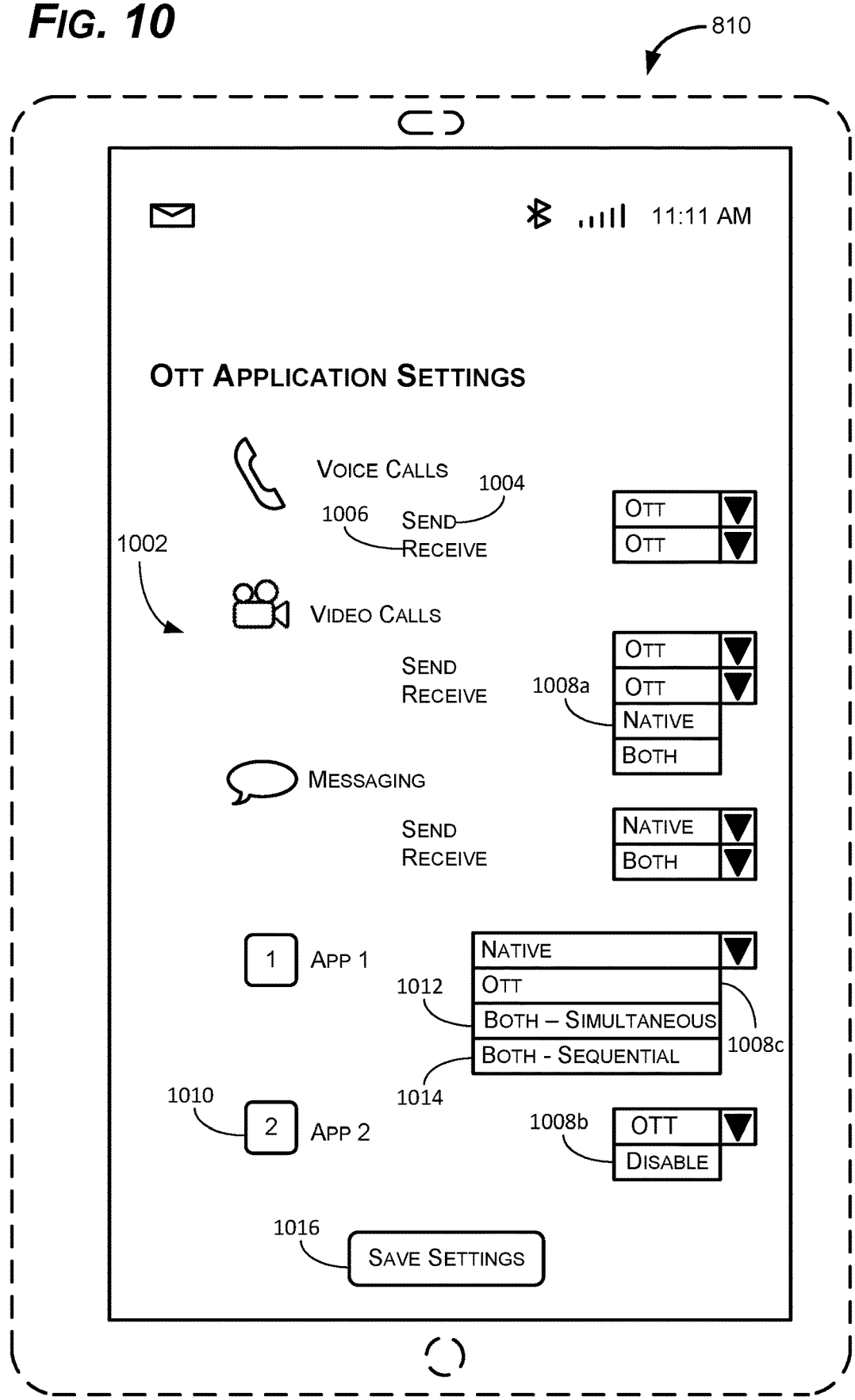
FIG. 10 is an example of an over-the-top (OTT) settings graphical user interface (GUI), in accordance with some examples of the present disclosure.

As shown in FIG. 10, examples of the present disclosure can also comprise the OTT settings GUI 810. The OTT settings GUI 810 can enable the user to set up the OTT application 104 initially and to dynamically change settings as desired. The user may wish to change various settings based on, for example, connection quality, traffic, weather conditions, etc. A user inside an office building, for example, may wish to route communications from a cellular connection 110 (which may be degraded inside large buildings) to an IP connection 112 inside the building for improved reception and/or speed.

As shown, the OTT settings GUI 810 can include an applications list 1002 comprising one or more applications that are included in the OTT application 104 and/or the standard applications 806. For applications that include bidirectional communications (e.g., calls and messaging), the OTT settings GUI 810 can also include separate send 1004 and receive 1006 subentries to enable the user to fully configure the OTT application 104.

Each entry or subentry can also include a drop-down menu 1008, or similar (i.e., radio buttons, check boxes, etc., could also be used to the same effect), to enable the user to configure various settings. The drop-down menus 1008 can contain entries relevant to the applications and to the UE 102. So, for example, a UE 102 that includes a native video call dialer and a video call dialer in the OTT application 104 may include a first drop-down menu 1008a that includes "OTT," "native," and/or "both." As implied, this can enable the user to receive video calls in the native application on the UE 102, in the OTT application 104, or both. In other examples, an application, such as "application 2" 1010, may only be available in the OTT application 104. As a result, the drop-down menu 1008b for application 2 1010 can include only "OTT" or "disable"—i.e., making application 2 1010 unavailable.

Some applications may be available both as a standard application 806 and in the OTT application 104. In this case, the user may be able to choose "both" to cause a phone call to ring in both applications, for example, or to cause a message to appear in the dialog box of both the native and OTT messaging applications. In some examples, it may be advantageous, therefore, to provide the user with additional granularity. To this end, these applications may include a drop-down menu 1008c that includes "both—simultaneous" 1012 and "both—sequential" 1014.

As the name implies, both-simultaneous 1012 can cause the message, call, or other communication to ring or appear in both the standard application 806 and the OTT application 104 at substantially the same time. Both-sequential 1014, on the other hand, can cause the message, call, or other communication to ring in one application first (e.g., the standard application 806) and then in the other application (e.g., the OTT application 104). Thus, a call may ring a predetermined number of rings (or times) in one application and then switch to ringing in another application. In some examples, a call may ring a predetermined amount of time. The sequence can be predetermined by the cellular or OTT application provider, for example, or can be user configurable in the OTT settings GUI 810. In some examples, the user may be further able to configure which application rings first or second. The user may also be able to set the delay or the number of rings, for example, between when one application stops ringing the other application starts ringing, among other things.

The OTT settings GUI 810 can enable the user to configure the OTT application 104 initially, and to reconfigure the OTT application 104 dynamically in response to changing conditions. If the UE 102 is an iOS device, for example, but the user needs to conduct a video call with an Android device, the user may reconfigure the OTT settings GUI 810 to use an Android-compatible video calling application within the OTT application 104 for sending video calls instead of using the native application (Facetime®) on the iOS device. This avoids the problem of being unable to conduct video calls between iOS devices and non-iOS devices. Similar incompatibilities can also be avoided without the need to install applications directly on the UE 102, or completely replace the UE 102, by providing these functions within the OTT application 104.

The OTT settings GUI 810 can also include a save settings input 1016. The save settings input 1016 can comprise a button on a touchscreen, a keyboard entry, or some other indication that the user is finished with the settings for the OTT application 104. In some examples, selecting the save settings input 1016 can prompt the UE 102, or the OTT application 104, to send an update to the TAS 116. If a user has changed from the native application to an application inside the OTT application 104, for example, then the OTT registrations 906 can be updated to reflect the change to effect proper routing in the future. In some examples, the UE 102 can send a SIP INFO, for example, with the updated settings to the TAS 116. In other examples, the UE 102 can simply reregister with the TAS 116 with a new SIP REGISTER, or similar.

While several possible examples are disclosed above, examples of the present disclosure are not so limited. For instance, while the systems and methods above are discussed with reference to making audio and video calls, sending and receiving messages, etc., on cellular 110 and IP 112 networks, the system could be used to provide enhanced functionality for many types of networks including, for example, PSTN 220, M2M, IoT, or future networks. Indeed, the systems and methods discussed herein could be used in the same, or a similar, manner to provide additional functionality on many kinds of devices that are capable of connecting to a variety of voice and data networks using the OTT application 104. In addition, while various functions are discussed as being performed on the UE 102; the TAS 116; or the I-CSCF 122, for example, other components, such as various other network entities, could perform some, or all, of these functions without departing from the spirit of the invention.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A telephony application server (TAS) associated with a network provider, comprising:
   a transceiver to send and receive at least one of wired or wireless transmissions;
   memory storing computer-executable instructions; and
   a processor in communication with at least the transceiver and the memory, the computer-executable instructions causing the processor to perform acts comprising:
      receiving, with the transceiver, a first signal from a first user equipment (UE) at a first internet protocol (IP) address, the first signal requesting to register a subscriber identification module identification (SIM ID) associated with the first UE for use with an over-the-top (OTT) application;
      authenticating, with the processor, the first UE;
      sending, with the transceiver, a second signal to a first network entity associated with the network provider, the second signal requesting account information associated with the SIM ID;
      receiving, with the transceiver, the account information;

correlating, with the processor, IP to SIM information associating a virtual line with at least one of the SIM ID, the account information, or the first IP address; and sending, with the transceiver, the IP to SIM information to the first UE.

2. The TAS of claim 1, the instructions further causing the processor to perform acts comprising:

storing, in the memory, the IP to SIM information in a list of OTT registrations, the list of OTT registrations associating one or more respective UEs with one or more respective SIM IDs.

3. The TAS of claim 1, wherein authenticating the first UE comprises determining that the first UE is connected to an internal connection, the internal connection associated with the network provider.

4. The TAS of claim 1, wherein authenticating the first UE comprises determining that the first UE is connected to an external connection, the external connection not associated with the network provider, and the acts further comprise:

sending, with the transceiver, a third signal to a second network entity to cause a two-factor authentication to be sent to the first UE; and receiving, with the transceiver, a fourth signal from the second network entity indicating that the first UE has been authenticated using the two-factor authentication.

5. The TAS of claim 1, the instructions further causing the processor to perform acts comprising:

receiving, with the transceiver, a third signal from the first UE requesting to register the virtual line with the TAS; and sending, with the transceiver, a fourth signal to a second network entity registering the virtual line with the second network entity.

6. The TAS of claim 5, wherein the third signal includes a header to set a default dialer for the first UE to a dialer in the OTT application.

7. The TAS of claim 1, wherein correlating the IP to SIM information with the virtual line further comprises associating the virtual line with one or more of an e-mail address, a cellular phone number, or a second IP address.

8. A method comprising:

receiving, with a transceiver of a telephony application server (TAS), a first invite from a network entity, the first invite including a subscriber identity module identification (SIM ID) for a first user equipment (UE) and requesting to establish a first communication on a first communication channel;

determining, with a processor of the TAS, that a first entry for the SIM ID is stored in over-the-top (OTT) registrations in a memory of the TAS; and sending, with the transceiver, a second invite requesting to establish the first communication on a second communication channel, wherein the first entry comprises internet protocol (IP) to SIM information associating a virtual line with one or more of the SIM ID, user account information, or a first IP address associated with the SIM ID.

9. The method of claim 8, wherein the first invite is associated with a native application on the first UE; and wherein the second invite is associated with an application inside an OTT application installed on the first UE.

10. The method of claim 9, wherein the first communication is a short messaging service (SMS) message;

wherein the first communication channel is associated with a native messaging application on the first UE; and wherein the second communications channel is associated with a messaging application inside the OTT application.

11. The method of claim 9, wherein the first communication is one of a voice call or a video call;

wherein the first communication channel is associated with a native calling application on the first UE; and wherein the second communications channel is associated with a calling application inside the OTT application.

12. The method of claim 11, wherein the first communication is a video call;

wherein the native calling application is associated with an operating system (OS); and wherein the calling application inside the OTT application is agnostic to the OS.

13. The method of claim 11, wherein the native calling application is associated with a first operating system (OS); and wherein the calling application inside the OTT application is associated with a second OS.

14. The method of claim 8, wherein the first UE is connected to a wireless residential gateway (WRG); and wherein the second invite is sent to the WRG and includes at least an IP address associated with the SIM ID.

15. A system comprising:

a telephony application server (TAS) associated with a network provider, comprising:

a transceiver to send and receive at least one of wired or wireless transmissions;

memory storing computer-executable instructions; and a processor in communication with at least the transceiver and the memory, the computer-executable instructions causing the processor to perform acts comprising:

receiving, with the transceiver, a first signal from a first user equipment (UE) at a first internet protocol (IP) address, the first signal requesting to register a subscriber identification module identification (SIM ID) associated with the first UE for use with an over-the-top (OTT) application;

authenticating, with the processor, the first UE;

sending, with the transceiver, a second signal to a first network entity associated with the network provider, the second signal requesting account information associated with the SIM ID;

receiving, with the transceiver, the account information;

correlating, with the processor, IP to SIM information associating a virtual line with at least one of the SIM ID, the account information, or the first IP address; and sending, with the transceiver, the IP to SIM information to the first UE.

16. The system of claim 15, the instructions further causing the processor to perform acts comprising:

storing, in the memory, the IP to SIM information in a list of OTT registrations, the list of OTT registrations associating one or more respective UEs with one or more respective SIM IDs.

17. The system of claim 15, wherein authenticating the first UE comprises determining that the first UE is connected to an internal connection, the internal connection associated with the network provider.

18. The system of claim 15, wherein authenticating the first UE comprises determining that the first UE is connected to an external connection, the external connection not associated with the network provider, and the acts further comprise:
    sending, with the transceiver, a third signal to a second network entity to cause a two-factor authentication to be sent to the first UE; and
    receiving, with the transceiver, a fourth signal from the second network entity indicating that the first UE has been authenticated using the two-factor authentication.

19. The system of claim 15, the instructions further causing the processor to perform acts comprising:
    receiving, with the transceiver, a third signal from the first UE requesting to register the virtual line with the TAS; and
    sending, with the transceiver, a fourth signal to a second network entity registering the virtual line with the second network entity.

20. The system of claim 19, wherein the third signal includes a header to set a default dialer for the first UE to a dialer in the OTT application.

\* \* \* \* \*